US008475879B1

(12) United States Patent
Borjanovic et al.

(10) Patent No.: US 8,475,879 B1
(45) Date of Patent: Jul. 2, 2013

(54) POLYMER NANOCOMPOSITES WITH IMPROVED RESISTANCE TO IONIZING RADIATION

(75) Inventors: Vesna Borjanovic, Cary, NC (US); Olga Alexander Shenderova, Raleigh, NC (US); Gary Elder McGuire, Chapel Hill, NC (US)

(73) Assignee: International Technology Center, Raleigh, NC (US)

( * ) Notice: Subject to any disclaimer, the term of this patent is extended or adjusted under 35 U.S.C. 154(b) by 161 days.

(21) Appl. No.: 12/942,251

(22) Filed: Nov. 9, 2010

Related U.S. Application Data

(60) Provisional application No. 61/407,404, filed on Oct. 27, 2010.

(51) Int. Cl.
*B05D 3/02* (2006.01)

(52) U.S. Cl.
USPC ............................. 427/385.5; 427/902

(58) Field of Classification Search
None
See application file for complete search history.

(56) References Cited

U.S. PATENT DOCUMENTS

| | | | |
|---|---|---|---|
| 7,224,039 B1 * | 5/2007 | McGuire et al. | 257/532 |
| 2006/0241236 A1 * | 10/2006 | Kuznetsov et al. | 524/495 |
| 2009/0297828 A1 * | 12/2009 | Shenderova et al. | 428/323 |
| 2010/0068503 A1 * | 3/2010 | Neogi et al. | 428/323 |
| 2010/0069567 A1 * | 3/2010 | Petrov et al. | 524/560 |
| 2010/0181534 A1 * | 7/2010 | Shenderova et al. | 252/301.16 |

OTHER PUBLICATIONS

Borjanovic et al, Journal of Vacuum Science and Technology, B, pp. 2396-2403, Nov./Dec. 2009.*
Borjanovic et al, Nanotechnology 19, 455701, 2008.*
Shenderova et al, Diamond and Related Materials, 16, 1213-1217, 2007.*

* cited by examiner

*Primary Examiner* — Erma Cameron
(74) *Attorney, Agent, or Firm* — Miller Patent Services; Jerry A. Miller

(57) ABSTRACT

Polymer nanocomposites with improved resistance to high energy ionizing radiation. Certain embodiments involve methods for providing a nanocomposite material with resistance to high energy ionizing radiation using nanodiamond, zinc oxide and mixtures of these nanoparticles with other nanoparticles dispersed within the matrix. Other embodiments relate to methods of delivering and dispersing the nanoparticles through the material or a surface layer. Other embodiments include methods of forming chemical bonds between the nanoparticles and the material. This abstract is not to be considered limiting, since other embodiments may deviate from the features described in this abstract.

33 Claims, 11 Drawing Sheets

FIG. 1A
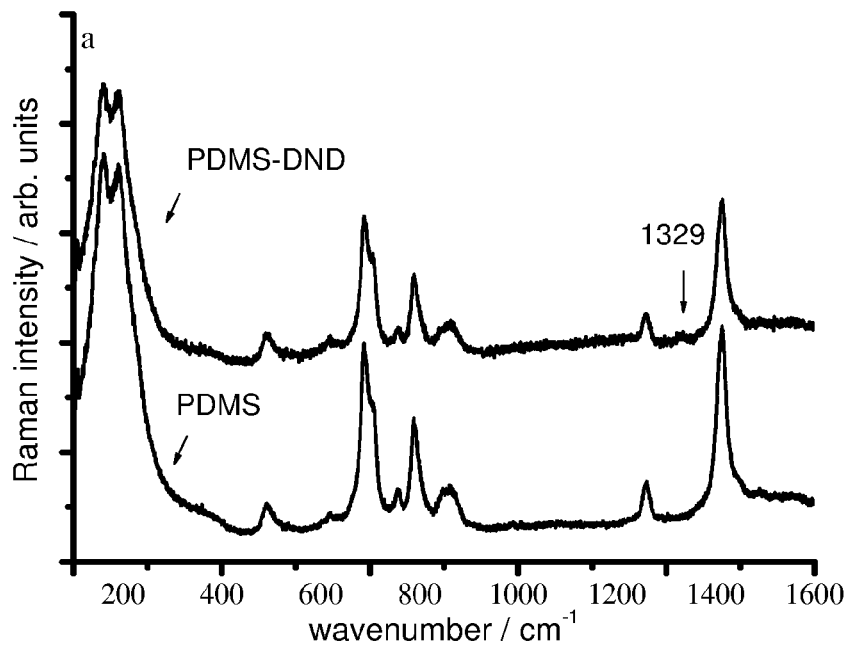
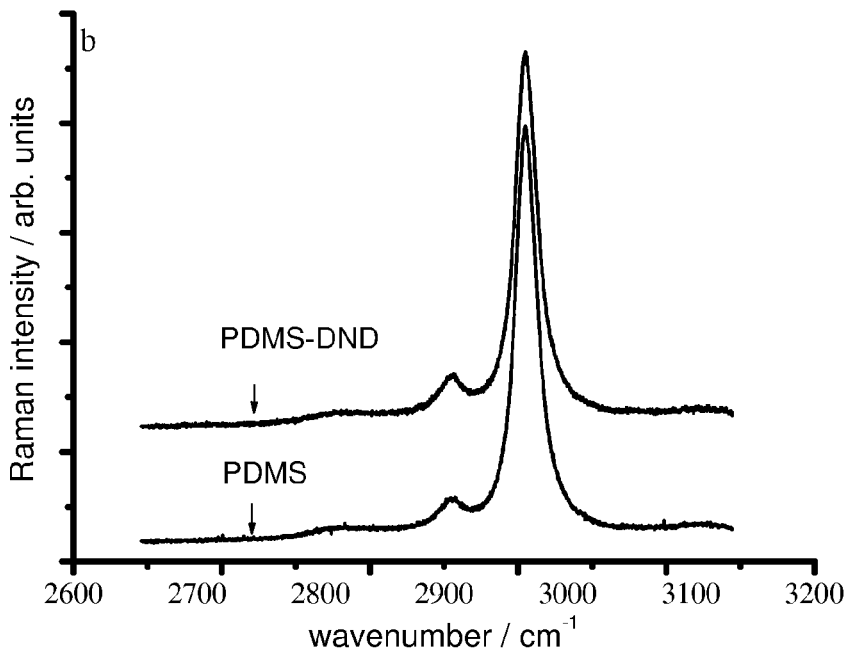
FIG. 1B

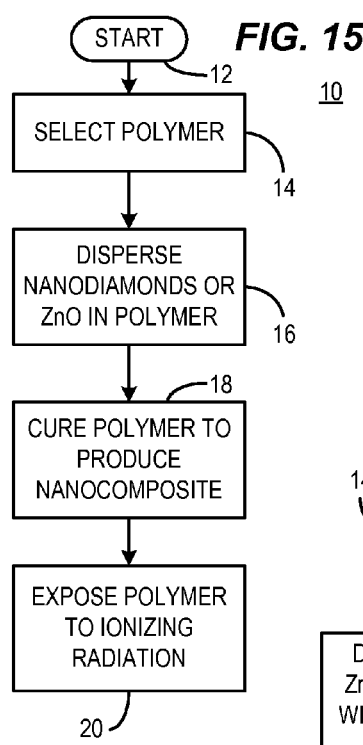
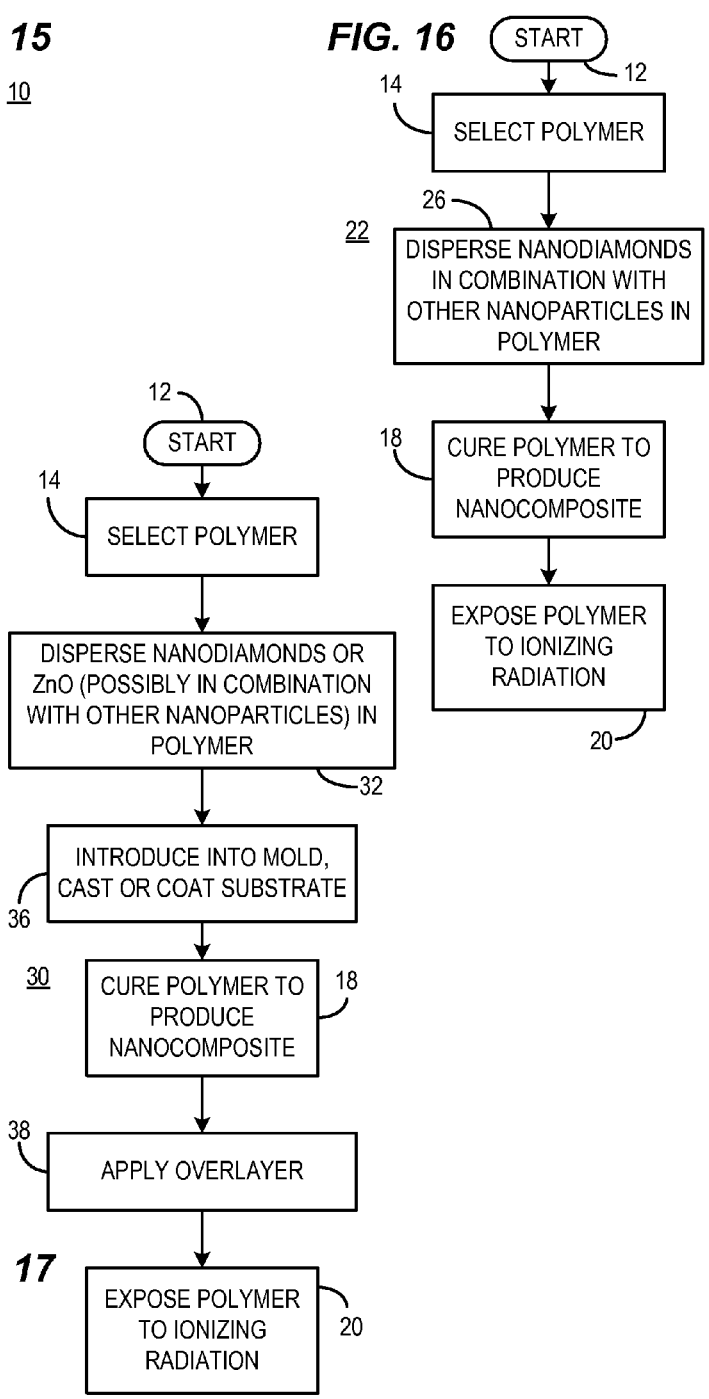

POLYMER NANOCOMPOSITES WITH IMPROVED RESISTANCE TO IONIZING RADIATION

CROSS REFERENCE TO RELATED DOCUMENTS

This application claims priority benefit of U.S. Provisional Application No. 61/407,404 filed Oct. 27, 2010 to Borjanovic entitled "Polymer Nanocomposites with Improved Resistance to Ionizing Radiation". This application is hereby incorporated herein by reference. Some of the work disclosed in this application was originally published by the inventors in "Influence of proton irradiation on the structure and stability of PDMS and PDMS-nanodiamond composite" by Borjanovic, et al., in J. Vac. Sci. Technol. B 27(6), November/December 2009, Published Nov. 10, 2009, copyright 2009 American Vacuum Society, which is also hereby incorporated herein by reference.

The following documents are referenced in the text below by the reference number shown adjacent thereto:

REFERENCES

1. A. J. Satti, N. A. Andreucetti, J. A. Ressia, M. F. Vallat, C. Sarmoria, and E. M. Velles, Eur. Polym. J. 44, 1548 (2008).
2. D. J. T. Hill, C. M. L. Preston, and A. K. Whittaker, Polymer 43, 1051 (2002).
3. D. J. T. Hill, C. M. L. Preston, D. J. Salisbury, and A. K. Whittaker, Radiat. Phys. Chem. 62, 11 (2001).
4. H. Xiao, C. Li, D. Yang, X. Li, and S. He, J. Appl. Polym. Sci. 109, 4060 (2008).
5. V. Borjanovic, W. G. Lawrence, S. Hens, M. Jaksic, I. Zamboni, C. Edson, I. Vlasov, O. Shenderova, and G. E. McGuire, Nanotechnology 19, 455701 (2008).
6. U.S. Pat. No. 7,399,794, Harmon et al.
7. U.S. Pat. No. 7,754,055, Harmon et. al.
8. O. Shenderova, T. Tyler, G. Cunningham, M. Ray, J. Walsh, M. Casulli, S. Hens, G. McGuire, V. Kuznetsov, S. Lipa, Diamond & Related Materials 16, 1213 (2007).
9. S. C. Hens, G. Cunningham, T. Tyler, S. Moseenkov, V. Kuznetsov, O. Shenderova, Diamond and Related Materials Vol 17, 11, 1858-1866 (2008).
10. L. Bistričić, V. Volovšek, V. Dananić, I. Movre Šapić, Spectrochim. Acta A 64 327 (2006).

COPYRIGHT AND TRADEMARK NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever. Trademarks are the property of their respective owners.

BACKGROUND

Polymers are increasingly used in radiation environments encountered in space crafts, rockets, satellites, airplanes (at high altitude), nuclear power plants, sterilization devices, high energy particle accelerators and other radiation prone environments. However, he use of polymeric materials in primary structures of spacecraft and aircraft is limited by the high temperatures encountered during launch, e.g. combustion gases, aerodynamic heating, and thermal cycling from approximately −175 to 160° C. as a result of exposure to thermal radiation from the sun as well as high-energy ionizing radiations and charging (electrostatic discharge effects). In terms of polymer degradation in space, low Earth orbit, defined as 200-1000 km above the Earth's surface, is a particularly challenging environment, since atomic oxygen is also present.

Ultraviolet light, x-rays, and gamma rays as well as high energy electrons and ions are all ionizing radiation. Ionizing radiation is a portion of the electromagnetic spectrum or type of particle which (for example, a photon, electron, or helium nucleus) carries enough energy to ionize an atom or molecule (that is, to completely remove an electron from its orbit). Galactic cosmic rays are high energy charged particles, originating in outer space and include high energy electrons, positrons, and other subatomic particles. The energy of cosmic rays is usually measured in units of mega-electron volts (MeV) or giga-electron volts (GeV) and have energies between 100 MeV and 10 GeV. Gamma rays may come from space or be produced by decaying radioactive materials. Gamma rays have great penetrating power but less ionizing power and are useful in the sterilizing of medical equipment by killing bacteria. They are also used to kill bacteria in foodstuffs, particularly meat and vegetables, High energy particle accelerators which generate energetic electrons and ions and nuclear devices and reactors which generate Gammas rays and energetic electrons are devices which are used to produce, as defined here, artificial or man-made high energy ionizing radiation. For the purpose of this document high energy ionizing radiation, whether of Galactic or artificial origin, is defined as ionizing radiation having energy above about 20 KeV.

BRIEF DESCRIPTION OF THE DRAWINGS

Certain illustrative embodiments illustrating organization and method of operation, together with objects and advantages may be best understood by reference detailed description that follows taken in conjunction with the accompanying drawings in which:

FIG. 15 shows a flow chart of an example of an implementation of a process consistent with certain embodiments of the present invention.

FIG. 16 shows a flow chart of an example of an implementation of a process consistent with certain embodiments of the present invention.

FIG. 17 shows a flow chart of an example of an implementation of a process consistent with certain embodiments of the present invention.

DETAILED DESCRIPTION

Figure 1C:
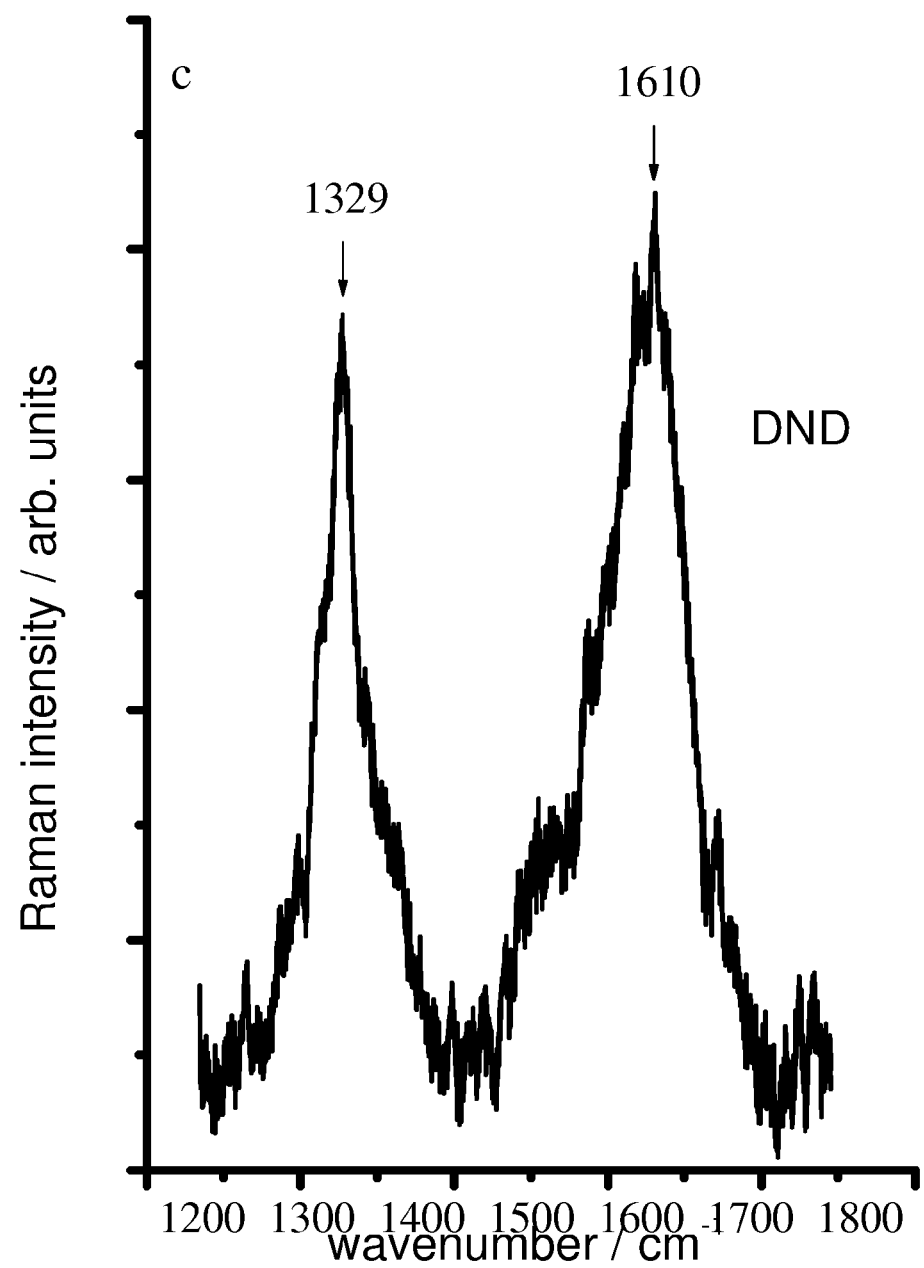
FIG. 1, which is made up of FIGS. 1A-1D show a comparison of Raman spectra of pure PDMS and PDMS containing 1 wt % 150 nm DND in the wavenumber ranges 100-1600 cm$^{-1}$ (a) and 2700-3100 cm$^{-1}$ (b) Raman spectra of DND powder (c), PDMS-DND and pure PDMS samples in the wavenumber region 1200-1800 cm$^{-1}$ (d).

While this invention is susceptible of embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically.

Reference throughout this document to "one embodiment", "certain embodiments", "an embodiment", "an example", "an implementation" or similar terms means that a particular feature, structure, or characteristic described in connection with the embodiment, example or implementation is included in at least one embodiment, example or implementation of the present invention. Thus, the appearances of such phrases or in various places throughout this specification are not necessarily all referring to the same embodiment, example or implementation. Furthermore, the particular features, structures, or characteristics may be combined in any suitable manner in one or more embodiments, examples or implementations without limitation.

The term "or" as used herein is to be interpreted as an inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

In spectroscopy, the wavenumber ν of electromagnetic radiation is defined as where λ is the wavelength of the radiation in a vacuum. The wavenumber has dimensions of inverse length and SI units of reciprocal meters (m-1). Commonly, the quantity is expressed in the cgs unit cm-1, pronounced as reciprocal centimeter or inverse centimeter. The use of the term "wavenumber" herein is defined as consistent with the use of this term in spectroscopy.

In the present document, percentages by weight are prior to curing.

As previously noted, polymers are increasingly used in radiation environments encountered in space crafts, rockets, satellites, airplanes (at high altitude), nuclear power plants, sterilization devices, high energy particle accelerators and other high energy radiation prone environments. However, the use of polymeric materials in primary structures of spacecraft and aircraft is limited by the high temperatures encountered during launch, e.g. combustion gases, aerodynamic heating, and thermal cycling from approximately −175 to 160° C. as a result of exposure to thermal radiation from the sun as well as high-energy ionizing radiations and charging (electrostatic discharge effects). In terms of polymer degradation in space, low Earth orbit, defined as 200-1000 km above the Earth's surface, is a particularly challenging environment, since atomic oxygen is also present.

To protect spacecraft from the harsh space environment polymer nanocomposites with radiation resistant properties may be used as the shielding material or in combination with a wide variety of durable materials and coatings, including oxide films, metals, and semiconductors. Unfortunately, microscopic scratches or imperfections in the coating or surface layer can result in defects in the protective material. These defects can provide pathways for attack, and degradation of the substrate.

High energy irradiation leads to changes in the chemical and physical properties of polymers. The changes are a function of the type of radiation, e.g. gamma rays, energetic ions or electrons and plasmas, and the fluence or dose per unit area. Interaction of such sources of radiation with polymer molecules produces a great amount of excited molecules and free radicals along their path into the polymer. The distribution of these species throughout the polymer sample is determined by the type and energy of the ionizing radiation, and is related to the linear rate of radiation energy transfer to the polymer. The subsequent chemical changes may include polymer modifications such as chain scission, radical formation, cross-linking, bond formation, grafting, molecular emission, recrystallization, amorphization and latent track formation. Physical properties that may be influenced by irradiation include glass transition temperature, heat of fusion, melting point, crystallization temperature, surface morphology, optical properties and mechanical properties such as tensile strength, hardness and bulk modulus. Increased resistance to degradation of nanocomposite materials used in high energy irradiation environments is a factor which contributes to the lifetime and reliability of polymer-based spacecraft components when such materials are exposed directly or indirectly to radiation.

For example polydimethylsiloxane (PDMS) is a polymer often used as a binder in thermal control coatings for spacecraft because it possesses outstanding properties such as good electric isolation and resistance to heat and aging. However, the significant increase in high energy irradiation resistance of the material when nanodiamonds are added to form a nanodiamond-PDMS (ND-PDMS) composite enhances the lifetime and reliability of these spacecraft components while the polymer retains a high level of processability for integrating the composites into apparatus exposed to high energy ionizing radiation. It is desirable to retain one or more of the qualities of exceptional biocompatibility, extrudability, elasticity, moldability, good fiber forming properties, tensile strength, durability, and the like that are the basis for the initial polymer selection for a particular application while providing greater radiation resistance.

The interaction of high energy ionizing radiation with polymers leads to a wide variety of modifications and induced property changes. Exposure of a polymeric material to high energy ionizing radiation produces crosslinking or/and scission reactions, which affect the molecular weight, the molecular weight distribution, and in turn the physical properties of the irradiated material. From a practical point of view, the study of irradiation induced changes in polymers is of interest as polymers have been widely used in medical devices and implants that require sterilization through the use of high energy gamma or electron irradiation. In addition, polymers such as PDMS, are often used as a binder in thermal control coatings for spacecraft, because they possess good electric isolation and resistance to heat and aging properties. However, the use of polymeric materials in primary structures of spacecraft is limited by the high temperatures encountered during launch, e.g. combustion gases and aerodynamic heating, as well as high-energy radiation [1,2]. It was reported that polysiloxanes are crosslinked upon exposure to high-energy radiation via a radical mechanism [3,4,5]. Recently, Xiao et al studied the optical degradation of PDMS under exposure of 150 keV protons to reveal the damage behavior of organic silicone in space [4]. Recently we reported enhanced photoluminescence (PL) of PDMS-DND composites [5] relative to pure PDMS induced by high energy proton irradiation which can be the basis for determining radiation exposure and dose. Following irradiation pure PDMS exhibits a noticeable stable blue PL, while the PDMS-DND composites exhibit a pronounced stable green PL under 425 nm excitation.

Proton irradiation introduced changes in the vibrational spectra of PDMS and PDMS-DND and PDMS-zinc oxide (ZnO), PDMS-MWCNT (multiwalled carbon nanotube) nanocomposite material and fluence were studied in order to develop an understanding of the chemical properties of the nanocomposite following irradiation. The role of nanoparticle size (ND and ZnO), concentration and ZnO functionalization was investigated as well as combinations of ZnO and ND plus ND and MWCNT in the nanocomposite. Polyurethane (PU) and the nanocomposites PU-ND and PU-ND-MWCNT were studied as a second set of nanocomposites with a different polymer base for comparison with the nanocomposites of PDMS. The goal was the optimization of the nanocomposite composition and processing conditions for the highest radiation resistance in high energy radiation environments. It is generally believed that molecular interactions between the nanomaterial and polymer matrix, especially in light of the larger surface area, contributes to the enhancement. The extent of the interaction is expected to also vary with the dimensionality of the nanomaterial. There are many other factors which may contribute to the radiation resistance but at this time are not understood.

This is the first report of a comparison of the vibrational and optical properties of pure PDMS and nanocomposites of PDMS and PU and nanocomposites of PU upon exposure to 2 MeV proton irradiation. It is also the first time that this type of experimental data (Raman, FTIR) for non-irradiated and irradiated PDMS and PDMS nanocomposites plus PU and PU nanocomposites has been discussed and the first reported use of these particular nanomaterials as a means to improve the stability of nanocomposites following irradiation. Although the use of single wall carbon nanotubes has been reported as a means to enhance the radiation resistance of polymers [6,7], the mechanisms involved may be very different than those when ND or ZnO are used for this purpose, although not completely understood at this time. The wide bandgap semiconductors ND and ZnO interact very differently with radiation. ZnO has a large exciton binding energy (~60 meV) and it has been reported that defects in ZnO from irradiation are annihilated, even at low temperatures. The wide bandgap materials are insulators unless doped to form semiconductors. Some applications may benefit from nanocomposites formed from a mixture of a wide bandgap material and the highly conductive CNT where enhanced electrical properties are needed, such as for electrostatic charge dissipation (ESD) or static control for which the goal is to increase electrical conductivity.

In accord with the present subject matter vibrational dynamics of pure polymer (PDMS and PU) and nanocomposites of the polymer containing one or more than one of the nanoparticles including ND, zinc oxide (ZnO) and multi-walled carbon nanotubes (MWCNT) were utilized to demonstrate radiation resistance of the nanocomposite relative to the pure polymer. In one aspect of present subject matter, PDMS and PDMS-DND (detonation nanodiamond) nanocomposites of both non-irradiated and irradiated samples were utilized to demonstrate the radiation resistance of the nanodiamond-based polymer composites. The vibrational bands of Raman and Fourier transform infrared (FTIR) spectra of the PDMS and PDMS-DND composites exhibit an overall reduction in intensity following irradiation. The changes in the relative intensities of the characteristic vibrational bands as a function of irradiation fluence indicate that cleavage of the backbone (Si—O—Si) PDMS chains and scission of C—H bands was most pronounced. A finding of the present experiments is identification that structural degradation of PDMS-DND composites takes place at an order of magnitude higher fluence than for pure PDMS. Thus, the nanocomposite material exhibits enhanced structural stability against the high energy proton irradiation utilized in these experiments as compared to pure PDMS exposed to proton irradiation under the same conditions. This experiment provides evidence for use of DND-based polymer composites in high energy radiation environments. In addition, polymer nanocomposites of DND were reported to exhibit increased thermal stability and mechanical strength as well as enhanced interfacial bonding [8]. Polymers transparent in the visible portion of the electromagnetic spectrum, such as PDMS, retain their transparency with the addition of DND and ZnO at higher loadings as compared to the addition of most other nanoparticles due to the wide bandgap of these two materials.

In addition to space applications, The present findings are also useful when such nanomaterials are subjected to environments where artificial high energy ionizing radiation is present such as in nuclear reactors and medical applications.

Many applications of the presently described enhanced polymer will be apparent upon consideration of the teachings of the present experiments and prothetic examples.

Materials and Method

The DND used in this work was synthesized by the detonation of a mixture of trinitrotoluene (TNT) and hexogen (RDX) explosives. The DND powder was purchased from New Technologies, Inc., Russia. The purification of the DND from detonation soot was performed using a mixture of sulfuric acid with chromic anhydride, followed by washing with deionized water, and dried. The DND sample was additionally purified using a mixture of NaOH and $H_2O_2$, then treated with ion-exchange resins and fractionated by centrifugation down to the volumetric average size of the aggregates (when measured in water suspensions) used in each experiment. The average size of the primary particles (monocrystals) forming the aggregates is approximately 4 nm.

The ZnO nanoparticles were purchased from two different vendors. ZnO particles with a size specification of 40-100 nm were purchased from Alfa Aesar, Chicago, Ill. ZnO nanoparticles with a size specification of 10-30 nm as well as 10-30 nm with silane coupling agent were purchased from SkySpring Nanotechnologies, Houston, Tex.

The multiple walled carbon nanotubes (MWCNT) were purchased from Nanostructured and Amorphous Materials, Inc, USA. The MWCNT had 0.5-1.0 micron length and 30 nm diameter.

The polydimethylsiloxane, Sylgard, was purchased from Dow-Corning as a two part material. The PDMS nanocomposites were prepared as reported previously [8]. When forming PDMS-nanodiamond composites, an intermediate solvent was employed that served as a dispersion medium for the nanoparticles prior to mixing with the polymer matrix. The nanoparticles were dispersed in the solvent and sonicated to break up large agglomerates, then the suspension was combined with un-cured PDMS and the solvent subsequently removed by vacuum. Curing of the PDMS-nanoparticle mixture resulted in films with good nanoparticle dispersion.

The nanocomposites of PU were prepared by mixing the nanoparticles were with the commercial formulation of oil-based polyurethane Minwax Clear Satin containing 60% of volatile compounds. (paint-and-supplies.hardwarestore.com/60-352-clear-finish-polyurethane/minwax-polyurethane-satin-finish-263251.aspx). When forming PU-nanoparticle composites, the intermediate solvent isopropyl alcohol was employed that served as a dispersion medium for the nanoparticles prior to mixing with the polymer matrix. The nanoparticles were dispersed in the solvent and sonicated to break up large agglomerates, then the suspension was combined with un-cured PU and the solvent subsequently removed by vacuum. Curing of the PU-nanoparticle mixture resulted in films with good nanoparticle dispersion. The nanoparticle content in the composite was varied.

Irradiation was carried out in vacuum with a 2 MeV proton beam that was delivered by the 1.0 MV Tandetron accelerator at the Rudjer Bošković Institute, Zagreb, Croatia. A homogeneous circular beam 5 mm in diameter was used. Low fluence irradiations with proton beam currents between 30 and 100 nA were carried out. Samples were irradiated in the range of fluences from $10^{13}$ protons/cm$^2$ to $10^{15}$ protons/cm$^2$. Samples were irradiated in four areas with different fluences. The fluence corresponding to region 1 (D1) and 2 (D2) was $5.7 \times 10^{13}$ protons/cm$^2$, but for region 1 a lower beam current was used (30 versus 50 nA and total charge of 5.6 µC, region 3 (D3) was $5.7 \times 10^{14}$ protons/cm$^2$ (current of 80 nA and total charge of 56 µC), region 4 (D4) was $1 \times 10^{15}$ protons/cm$^2$ (current of 100 nA and total charge of 100 µC). The doses in the range of $10^{10}$-$10^{12}$ protons/cm$^2$ tend not to show any noticeable influence on material properties. All irradiation treatments were done at room temperature.

The FTIR spectra were recorded using a ABB BOMEM BM 102 Spectrometer. The spectra were recorded over frequency range 600-4000 cm-1 using a Single Reflection ATR system. The spectra were collected with a resolution of 2 cm-1 by co-adding the results of ten scans. A reference spectrum was collected before each measurement.

Raman spectra were recorded using a Horiba Jobin YvonT64000 instrument equipped with an Olympus open microscope stage and charge coupled device Symphony detector. The spectrometer was operated in triple subtractive mode during the acquisition of spectra in the frequency regions of 20-1700 and 2650-3150 cm-1. Spectra of PDMS and PDMS-DND irradiated with fluencies D3 and D4 were recorded in autoscanning mode. The spectra of DND were taken with a notch filter in single mode in the frequency region from 200 to 2000 cm-1. The 514.5 nm line of a Coherent INNOVA-400 argon ion laser was used for excitation with laser power of 20 mW at the sample.

EXAMPLES

Example 1

Proton Irradiation of PDMS and PDMS-ND

Samples of pure PDMS polymer and PDMS-DND composite containing 1 wt % 150 nm DND were irradiated in vacuum with a 2 MeV proton beam that was delivered by the 1.0 MV Tandetron accelerator at the Rudjer Bošković Institute, Zagreb, Croatia. A homogeneous circular beam 5 mm in diameter was used. Low fluence irradiations with proton beam currents between 30 and 100 nA were carried out. Samples were irradiated in the range of fluences from $10^{13}$ protons/cm$^2$ to $10^{15}$ protons/cm$^2$. PDMS as well as PDMS-DND samples were irradiated in 4 areas with different fluences. The fluence corresponding to region 1 (D1) and 2 (D2) is $5.7 \times 10^{13}$ protons/cm$^2$, but for region 1 a lower beam current was used (30 nA versus 50 nA, total charge 5.6 µC), region 3 (D3) was $5.7 \times 10^{14}$ protons/cm$^2$ (current 80 nA, total charge 56 µC), region 4 (D4) is $1 \times 10^{15}$ protons/cm$^2$ (current 100 nA, total charge 100 µC). The doses in the range $10^{10}$ protons/cm$^2$ to $10^{12}$ protons/cm$^2$ tend not to show any noticeable influence on material properties [5]. All irradiation treatments were done at room temperature.

Example 2

Raman and FTIR Characterization of Pristine Samples

For the study of nonirradiated PDMS, PDMS-DND and nanodiamond samples, Raman and FTIR spectra were obtained in order to determine if the incorporation of DND nanoparticles into a polymer modifies the structural and chemical dynamics of the polymer matrix. PDMS is a polymer with a high degree of chain flexibility, facilitating accommodation of the polymer chains around the incorporated nanoparticles. Since the DND used in the present study posses some amount of hydroxil groups on the surface as indicated in our previous studies [9] silane chemical bonds can be formed, in principle, between DND and the siloxane groups of PDMS during polymer curing.

Raman spectra of pure PDMS and PDMS-DND composites are shown in FIG. 1. (c,d) The assignment of characteristic vibrational bands is based on a comparison with our previous results [9] and reported data on PDMS [10]. The repeating unit of PDMS is —(Si(CH3)2-O)—. The Raman shift related to $CH_3$ vibrational bands are as follows: 2967 and 2906 $cm^{-1}$ (stretching), 1413 and 1260 $cm^{-1}$ (deformation), 865, 756 and 688 $cm^{-1}$ (rocking). The signature related to Si—O—Si groups is 492 $cm^{-1}$ (symmetric stretching). Characteristic features in the Raman spectra related to the C—Si—C groups are: 845 and 790 $cm^{-1}$ (asymmetric stretching), 706 $cm^{-1}$ (symmetric stretching), 193 $cm^{-1}$ (wagging), and 163 $cm^{-1}$ (twisting).

Figure 1D:
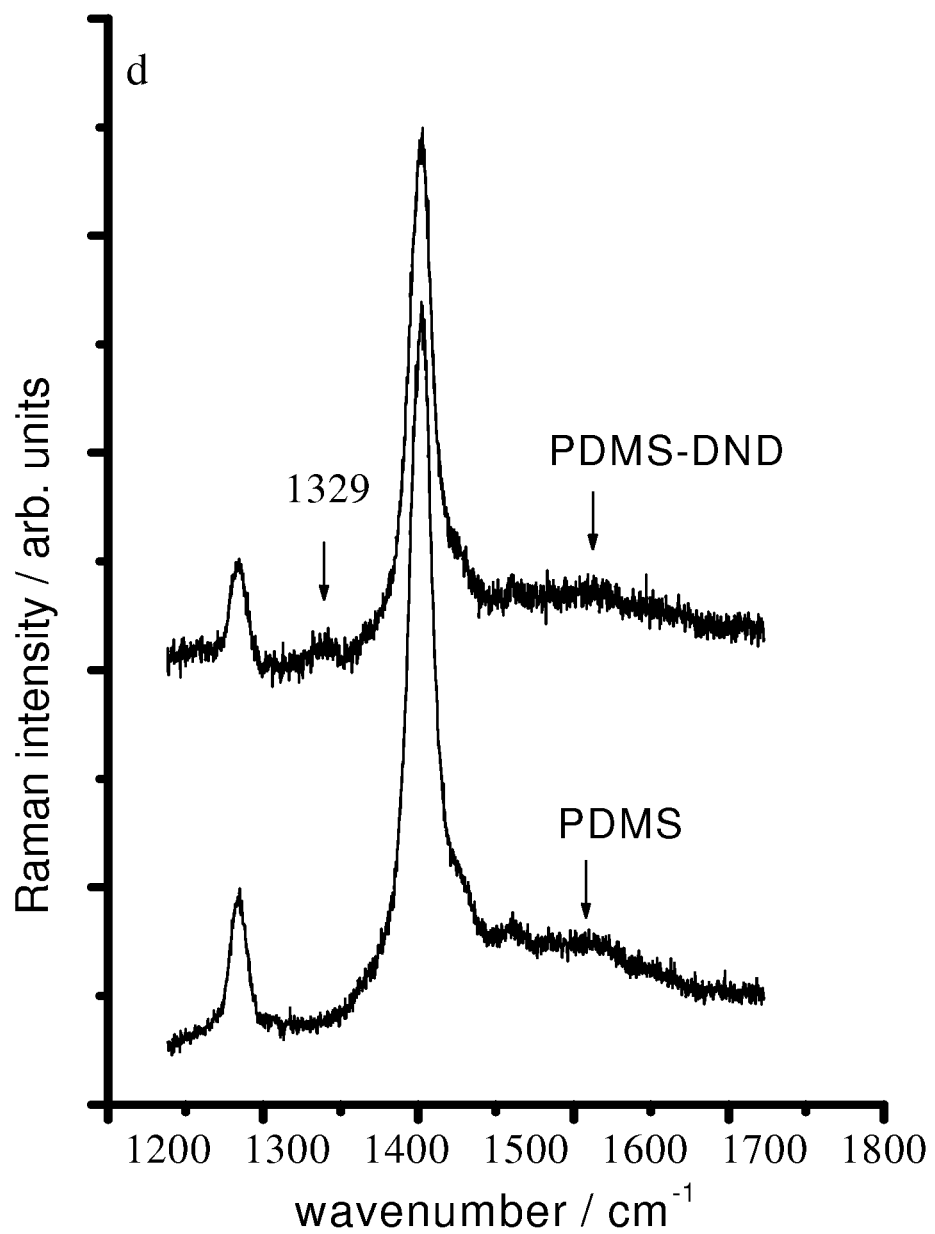

As it can be seen from FIG. 1, the DND nanoparticles did not significantly modify the shape of the vibrational spectra of the PDMS matrix; all of the characteristic Raman vibrational bands of PDMS are also present in the nanocomposite material PDMS-DND. The difference between vibrational spectra of pure PDMS and PDMS-DND material can be clearly seen on FIG. 1(d) where the Raman spectra of the PDMS-DND, PDMS and pure DND powder is presented for the frequency region 1200-1800 $cm^{-1}$. The Raman band at 1329 $cm^{-1}$ for the pure diamond sample is due to the sp3 carbon bonding of diamond. The band at 1610 $cm^{-1}$ is a convolution of sp2 bonded carbon as well as possible contribution from oxygen containing groups on the DND surface (including adsorbed water molecules) As it can be seen from the FIG. 1(d), the characteristic nanodiamond band at 1329 $cm^{-1}$ was observed only in Raman spectra of PDMS-DND nanocomposites. While the nanodiamond band at 1329 $cm^{-1}$ is well distinguishable in the PDMS-DND spectra, the band at 1610 $cm^{-1}$ is not well pronounced in the spectra of the composite, indicating that chemical bonds between PDMS chains and oxygen-containing DND surface groups and sp2 carbon species possibly were formed.

The FTIR spectra of pure PDMS and PDMS containing 1 wt % 150 nm DND were identical (spectra not shown). The characteristic vibrations of siloxane chains are strong IR bands observed at 1060 and 1012 $cm^{-1}$ (asymmetric Si—O—Si stretching), (while the weak Raman band at 492 $cm^{-1}$ is associated with symmetric Si—O—Si stretching). There is no spectroscopic evidence of formation of ring structures in PDMS. Other characteristic IR signatures of PDMS are related to C—Si—C groups: 845 and 790 $cm^{-1}$ (asymmetric stretching), 700 $cm^{-1}$ (symmetric stretching). Methyl groups have characteristic bands at 2962 and 2906 $cm^{-1}$ (stretching), 1413, 1403 and 1260 $cm^{-1}$ (deformation), 865, 756 and 688 $cm^{-1}$ (rocking).

FIG. 1 shows a Comparison of Raman spectra of pure PDMS matrix and PDMS containing 1 wt % 150 nm DND in the wavenumber ranges 100-1600 $cm^{-1}$ (a) and 2700-3100 $cm^{-1}$ (b). Raman spectra of DND powder (c), pure PDMS and PDMS containing 1 wt % DND in the wavenumber region 1200-1800 $cm^{-1}$ (d).

Example 3

Raman Characterization of Proton Irradiated PDMS Samples

Figure 2:
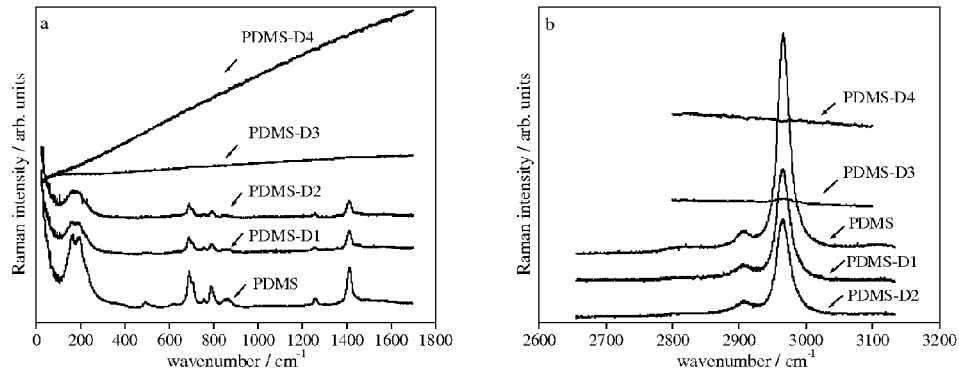
FIG. 2, which is made up of FIGS. 2A-2B shows Raman spectra of pristine and irradiated PDMS in the wavenumber ranges 10-1700 cm$^{-1}$ (a) and 2650-3150 cm$^{-1}$ (b).

FIG. 2 presents Raman spectra of 2 MeV proton irradiated pure PDMS. The Raman spectra are for the spectral regions 10-1700 $cm^{-1}$, and 2650-3150 $cm^{-1}$ taken from a pristine PDMS sample and from four irradiated spots of PDMS at different irradiation conditions.

Exposure to high energy ionizing radiation can lead to significant irreversible changes in the chemical, structural, optical, thermal and electrical properties of polymers. The interaction of high energy radiation with polymer molecules produces significant numbers of excited and dissociated molecules along their path into the polymer. The distribution of these species throughout the polymer sample is determined by the type and energy of the ionizing radiation, and is related to the rate of energy transfer to the polymer along the path of the radiation. The energy transferred to the polymer induces the formation of radicals which in turn become involved in chemical reactions that result in cross-linking and scission.

As can be seen from FIG. 2 the changes in intensity for all the characteristic vibrational bands are significant following irradiation. The characteristic vibrational bands decrease with irradiation dose and disappear under D3, D4 fluence conditions accompanied by the appearance of a large fluorescent background.

FIG. 2 shows Raman spectra of pristine and irradiated PDMS at four different conditions (D1, D2, D3, D4) in the wavenumber ranges 10-1700 $cm^{-1}$ (a) and 2650-3150 $cm^{-1}$ (b).

Example 4

FTIR Characterization of Proton Irradiated PDMS Samples

Figure 3:
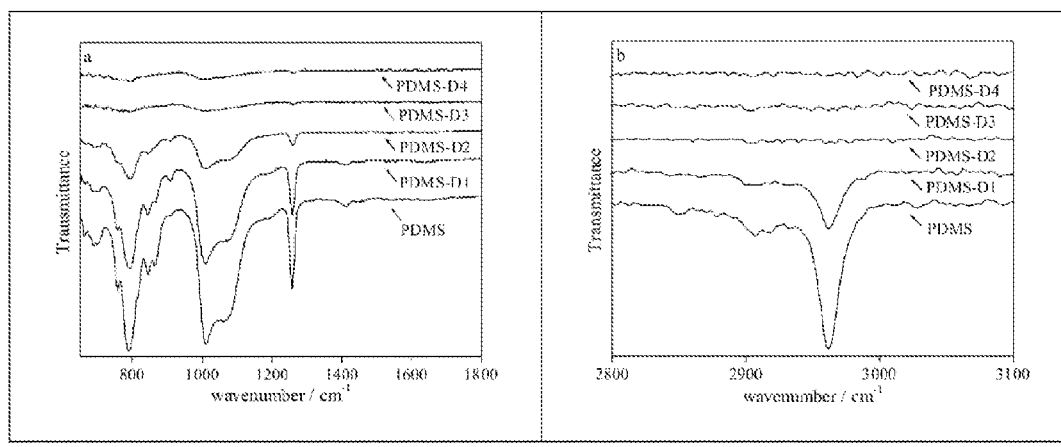
FIG. 3, which is made up of FIGS. 3A-3B shows FTIR spectra of four areas of a PDMS sample irradiated in vacuum with a 2 MeV proton beam compared to pristine PDMS in the wavenumber ranges 700-1800 cm$^{-1}$ (a) and 2800-3100 cm$^{-1}$ (b).

FTIR spectra of irradiated PDMS samples are presented for comparison with the FTIR spectrum of an untreated sample in FIG. 3. The transparency of PDMS samples decreased with the radiation dose (the irradiated areas become yellowish). The intensities of the vibrational bands decreased.

From an analysis of the FTIR spectra one can recognize that even small changes in the irradiation conditions cause noticeable changes in the IR spectra. For example, the difference in D1 and D2 irradiation conditions is only in the current (30 nA versus 50 nA) while the total charge delivered (fluence) is the same. Yet, differences in the FTIR spectra are observed. The spectrum for PDMS-D2 shows a further decrease in the intensity when compared with that of PDMS-D1. It should be noticed that similar changes in intensity with irradiation conditions are not so obvious for the Raman spectra (see FIG. 2). However, as we pointed out previously the FTIR method does not provide insight into how the DND is incorporated into the matrix material (no appearance of characteristic bands associated with bonding between the DND and PDMS in the nanocomposite).

FIG. 3 shows FTIR spectra of PDMS before and after irradiation at four different conditions (D1, D2, D3, D4)

compared to pristine PDMS in the wavenumber ranges 700-1800 cm$^{-1}$ (a) and 2800-3100 cm$^{-1}$ (b).

Example 5

Raman and FTIR Characterization of Proton Irradiated PDMS-DND Samples

Figure 4:
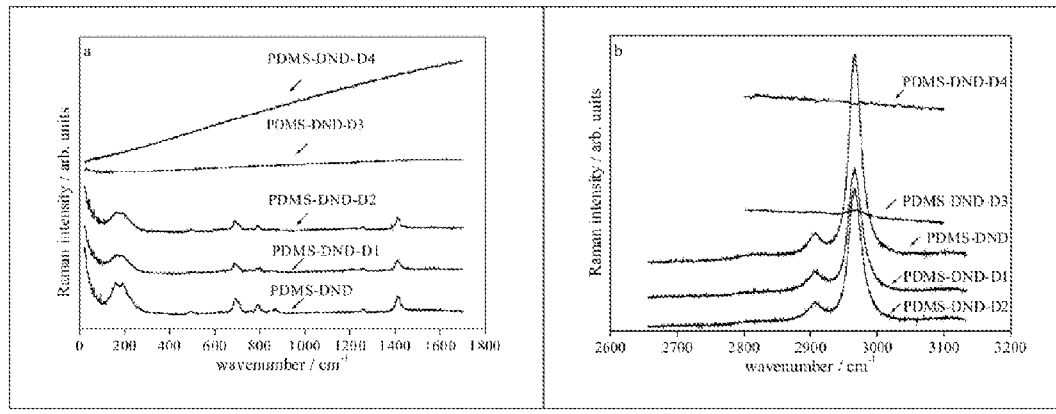
FIG. 4, which is made up of FIGS. 4A-4B shows Raman spectra in the wavenumber ranges 10-1700 cm$^{-1}$ (a) and 2650-3150 cm$^{-1}$ (b) of PDMS containing 1 wt % 150 nm DND before and after irradiation at four different conditions (D1, D2, D3, D4) in vacuum with 2 MeV proton beam radiation.
Figure 5:
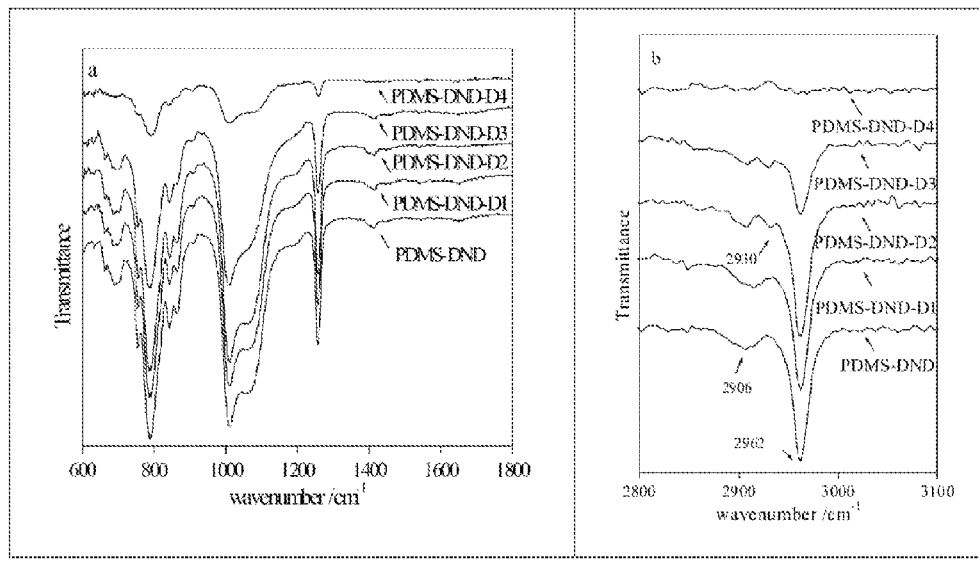
FIG. 5, which is made up of FIGS. 5A-5B FTIR spectra in the wavenumber ranges 600-1800 cm$^{-1}$ (a) and 2800-3100 cm$^{-1}$ (b). of PDMS containing 1 wt % 150 nm DND before and after irradiation at four different conditions (D1, D2, D3, D4) in vacuum with 2 MeV proton beam radiation.

The Raman and FTIR spectra of the nanocomposite PDMS-DND material are presented in FIGS. 4 and 5, correspondingly. From a comparison of the Raman and FTIR spectra of the pure PDMS polymer (FIGS. 2 and 3) and the PDMS-DND composite material (FIGS. 4 and 5) it can clearly be seen, especially from the comparison of the FTIR spectra, that the vibrational band intensities, representing sample changes, decrease and disappear more slowly with fluence for the PDMS-DND nanocomposite as compared to the pure polymer. Particularly, in the case of pure PDMS under the fluence D2, the C—H stretching vibration bands are already absent, while for the composite PDMS-DND material even at one order of magnitude higher fluence (D3) the bands are still clearly present. Thus, it can be concluded that the PDMS-DND nanocomposite material is more stable in a high energy radiation environment such, as for example, space environment, where the particle spectrum is comprised of high energy electrons and protons with energies from a few keV to more than 100 MeV. Our experimental results indicate that nanodiamond incorporation into PDMS made the material more high energy radiation resistant by up to approximately one order of magnitude for the studied cases. The exact mechanism is unknown.

Another finding based on the above measurements is that no new chemical species were detected (no new major vibrational bands appeared). The appearance of only one additional small band at 2930 cm$^{-1}$ related to C—H stretching was detected (see FIG. 5, curves PDMS-DND-D2 and PDMS-DND-D3). The absence of any new detectable phases being formed as a result of irradiation is also of interest. To further evaluate how the DND nanoparticles are incorporated inside the PDMS polymer matrix and in order to establish the nature of possible chemical bonding between DND and PDMS, an analysis of relative intensities of normal modes was performed.

The intensities were evaluated by integrating the area under the respective Raman vibrational bands after baseline corrections. Lorentz functions were fitted to the experimental spectra to separate overlapping bands. Half-widths and intensities were allowed to vary in the iteration process. The maximum error associated with the fit was estimated to be less than 5%. The ratio of integrated intensities of several peaks connected to the vibrations of the side CH$_3$ groups and longer polymer chains is presented in Table 1. The relative intensities $I_{2967}/I_{2905}$ of CH$_3$ stretching vibrations were lower in PDMS-DND (FIGS. 4, 5) in comparison with pure PDMS. The relative intensities of CH stretching bands in comparison to the vibrations of side chains (C—Si—C) and long chains (Si—O—Si) also decreased ($I_{2967}/I_{790}$, and $I_{2967}/I_{492}$, correspondingly). The observed changes in the Raman spectra of PDMS and PDMS-DND confirmed the bonding between PDMS and DND nanoparticles. The FTIR spectra showed similar behavior, but it was not possible to analyze the absorbance spectra by a fitting procedure because of the very high intensities of absorbance bands. The results in Table 1 provide evidence that the cleavage of the main chains (Si—O—Si) is most pronounced in the irradiated samples.

FIG. 4 shows Raman spectra of PDMS containing 1 wt % 150 nm DND before and after radiation at four different conditions (D1, D2, D3, D4) in the wavenumber ranges 10-1700 cm$^{-1}$ (a) and 2650-3150 cm$^{-1}$ (b). FIG. 5 shows FTIR spectra of PDMS containing 1 wt % 150 nm DND before and after irradiation at four different conditions (D1, D2, D3, D4) in the wavenumber ranges 600-1800 cm$^{-1}$ (a) and 2800-3100 cm$^{-1}$ (b).

TABLE 1

The ratio of integrated intensities of several peaks connected to the vibrations of the side CH$_3$ groups and the side chains (C—Si—C) or the back bone chains (Si—O—Si).

| Relative intensities | PDMS | PDMS-dose 1 | PDMS-dose 2 | PDMS-DND | PDMS-DND dose 1 | PDMS-DND dose 2 |
|---|---|---|---|---|---|---|
| $I_{2967}/I_{2905}$ | 26.25 | 12.88 | 13.96 | 15.58 | 9.75 | 10.53 |
| $I_{2967}/I_{790}$ | 11.05 | 13.92 | 18.69 | 15.09 | 19.42 | 18.60 |
| $I_{2967}/I_{492}$ | 32.31 | 51.07 | 72.98 | 27.56 | 48.68 | 90.41 |

Example 6

FTIR Characterization of Proton Irradiated PDMS-MWCNT Samples

FTIR spectra were obtained in the wavenumber range 600-3100 cm$^{-1}$ of PDMS containing 1% wt of MWCNT unirradiated and following irradiation in vacuum with 2 MeV proton beam radiation at four different conditions (D1, D2, D3, D4). From a comparison of the FTIR spectra, it can clearly be seen, especially that the vibrational band intensities, representing sample changes, decrease and more slowly with fluence for the PDMS-MWCNT nanocomposite (FIG. 6) as compared to the pure polymer. The experimental results indicate that MWCNT incorporation into PDMS made the material more radiation resistant by up to approximately one order of magnitude for the studied cases. The MWCNT were used as received from the vendor with no additional purification or cleaning and no functionalization.

Figure 6:
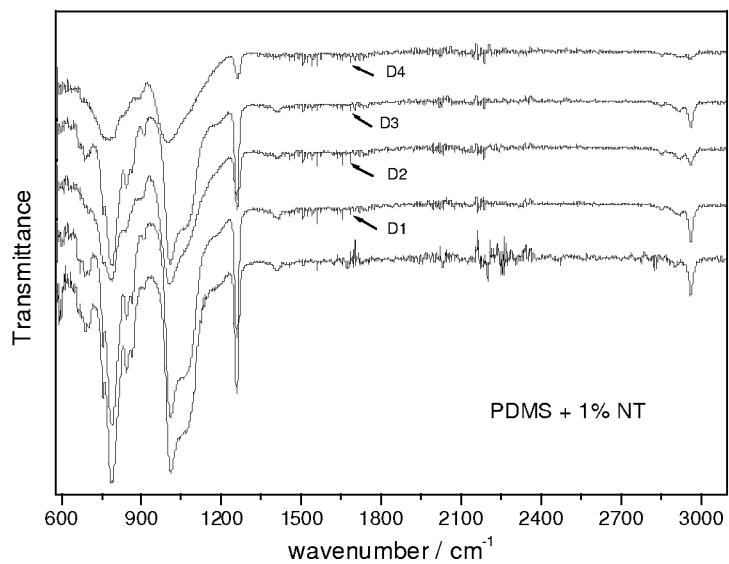
FIG. 6 shows FTIR spectra in the wavenumber range 600-3100 cm$^{-1}$ of PDMS containing 1% wt of MWCNT unirradiated and following irradiation in vacuum with 2 MeV proton beam radiation at four different conditions (D1, D2, D3, D4).

FIG. 6 shows FTIR spectra in the wavenumber range 600-3100 cm$^{-1}$ of PDMS containing 1% wt of MWCNT unirradiated and following irradiation in vacuum with 2 MeV proton beam radiation at four different conditions (D1, D2, D3, D4).

Example 7

FTIR Characterization of Proton Irradiated PDMS-40 Nm DND Samples

In order to evaluate the particle size impact on the high energy radiation resistance of polymer nanocomposites, IR spectra in the wavenumber range 600-3100 cm$^{-1}$ of were taken for PDMS containing 1% wt of 40 nm ND before and following irradiation in vacuum with 2 MeV proton beam radiation at four different conditions (D1, D2, D3, D4) (FIG.

7) for comparison with the IR spectra presented in FIG. 3. From the comparison of the FTIR spectra, it can clearly be seen, especially that the vibrational band intensities, representing sample changes, decrease and more slowly with fluence for the PDMS-DND nanocomposite as compared to the pure polymer for both the 40 nm and 150 nm DND-based nanocomposites. The vibrational bands are almost absent for the pure polymer but are still strong for both the 40 nm and 150 nm DND nanocomposites at the order of magnitude higher fluence D3 and are still present at the two orders of magnitude higher fluence D4.

Figure 7:
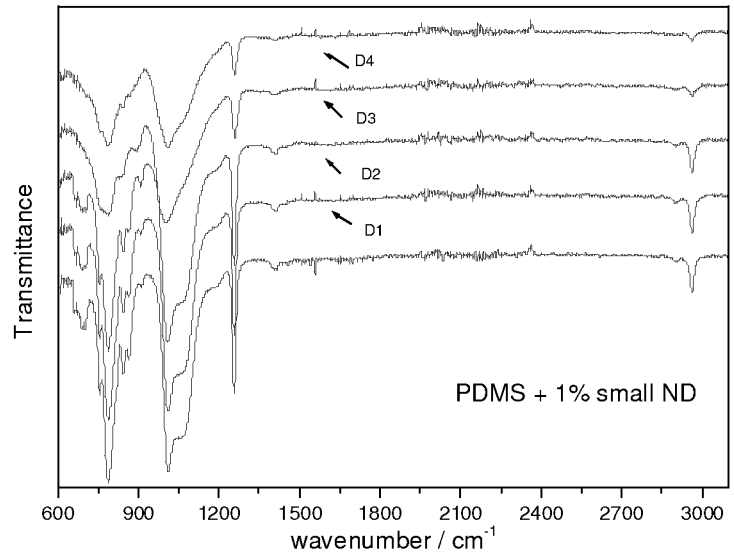
FIG. 7 shows FTIR spectra in the wavenumber range 600-3100 cm$^{-1}$ of PDMS containing 1% wt of 40 nm ND before and following irradiation in vacuum with 2 MeV proton beam radiation at four different conditions (D1, D2, D3, D4).

FIG. 7 shows FTIR spectra in the wavenumber range 600-3100 $cm^{-1}$ of PDMS containing 1% wt of 40 nm ND before and following irradiation in vacuum with 2 MeV proton beam radiation at four different conditions (D1, D2, D3, D4).

Example 8

FTIR Characterization of Proton Irradiated PDMS-ZnO Samples

Both diamond and ZnO are wide bandgap semiconductors. In order to compare the radiation resistance of nanocomposite polymers prepared using these two different materials, FTIR spectra were obtained in the wavenumber range 600-3100 $cm^{-1}$ of PDMS containing 1% wt of 40-100 nm ZnO un-irradiated and following irradiation at the same four conditions (D1, D2, D3, D4) as those used for the DND-based composites in Example 7. A comparison of the FTIR spectra in FIGS. 7 and 8 reveal that the ZnO-based PDMS nanocomposite shows even better high energy radiation resistance than the comparable DND-based materials. Even at the fluence D4, the vibration bands in the IR spectra of the ZnO-based nanocomposite are still quiet strong.

Figure 8:
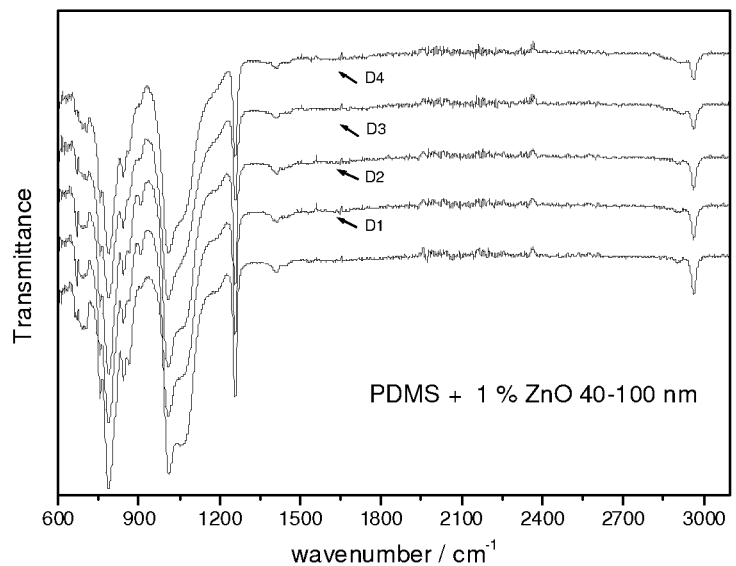
FIG. 8 shows FTIR spectra in the wavenumber range 600-3100 cm$^{-1}$ of PDMS containing 1% wt of 40-100 nm ZnO un-irradiated and following irradiation at four different conditions (D1, D2, D3, D4) in vacuum with 2 MeV proton beam radiation.

FIG. 8 shows FTIR spectra in the wavenumber range 600-3100 $cm^{-1}$ of PDMS containing 1% wt of 40-100 nm ZnO un-irradiated and following irradiation at four different conditions (D1, D2, D3, D4) in vacuum with 2 MeV proton beam radiation.

Example 9

FTIR Characterization of Proton Irradiated PDMS-ZnO Functionalized

The surface area and nature of the interface between the nanoparticles and the polymer matrix is believed to influence the high energy radiation resistance of nanocomposite materials. In order to compare the high energy radiation resistance of nanocomposites with and without functionalized nanoparticles, FTIR spectra were obtained in the wavenumber range 600-3100 $cm^{-1}$ of PDMS containing 1% wt of 10-30 nm ZnO functionalized with silane coupling agent un-irradiated and following irradiation at the same four conditions (D1, D2, D3, D4) as those used for the ZnO-based composites in Example 8. A comparison of the FTIR spectra in FIGS. 8 and 9 reveal that the silane functionalized ZnO-based PDMS nanocomposite shows less high energy radiation resistance than the comparable ZnO-based material. However, the silane functionalized ZnO-based PDMS nanocomposite shows better performance than the pure PDMS. A variety of other surface functional groups could be utilized for ZnO providing a range of performance.

Figure 9:
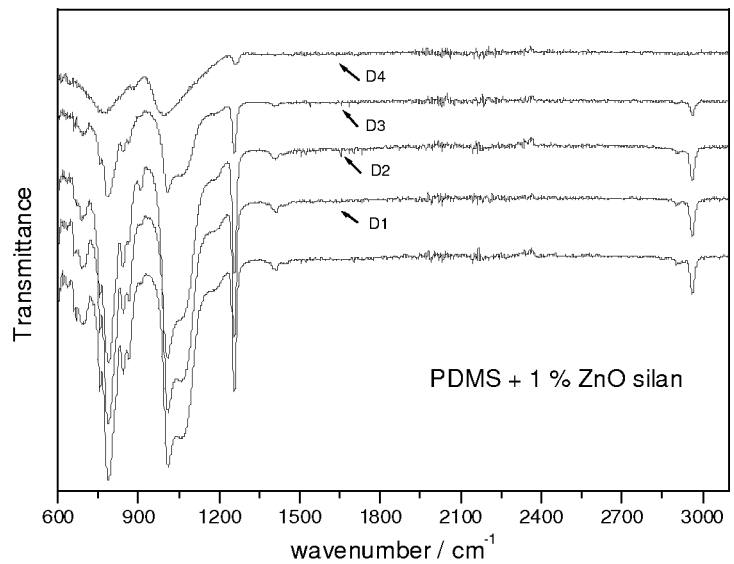
FIG. 9 shows FTIR spectra in the wavenumber range 600-3100 cm$^{-1}$ of PDMS containing 1% wt of 10-30 nm ZnO functionalized with silane coupling agent un-irradiated and following irradiation at four different conditions (D1, D2, D3, D4) in vacuum with 2 MeV proton beam radiation.

FIG. 9 shows FTIR spectra in the wavenumber range 600-3100 $cm^{-1}$ of PDMS containing 1% wt of 10-30 nm ZnO functionalized with silane coupling agent un-irradiated and following irradiation at four different conditions (D1, D2, D3, D4) in vacuum with 2 MeV proton beam radiation.

Example 10

FTIR Characterization of Proton Irradiated PDMS with Mixture of DND and ZnO

Since nanoparticles interact with the polymer chains, free radicals, molecular fragments and ions, it is assumed that the size, distribution and concentration all play a role in the high energy radiation resistance of a polymer nanocomposite. In order to evaluate the high energy radiation resistance of nanocomposites as a function of concentration FTIR spectra in the wavenumber range 600-3100 $cm^{-1}$ of PDMS containing a mixture of 5% wt of 10-30 nm ZnO functionalized with silane coupling agent and 5% wt 120 nm ND un-irradiated and following irradiation at the same four conditions (D1, D2, D3, D4) as those used for the ZnO-based composites in Example 7 and 9. A comparison of the IR spectra in FIG. 10 with those in FIGS. 7 and 9 reveal that the combination of silane functionalized ZnO and DND at a concentration of 10 wt % provides greater high energy radiation resistance than 1 wt % silane functionalized ZnO-based and 1 wt % 40 nm DND-based PDMS nanocomposites. The high energy radiation resistance is among the highest observed and is of the same order of magnitude of the high energy radiation resistance of the 1 wt % ZnO-based material.

Figure 10:
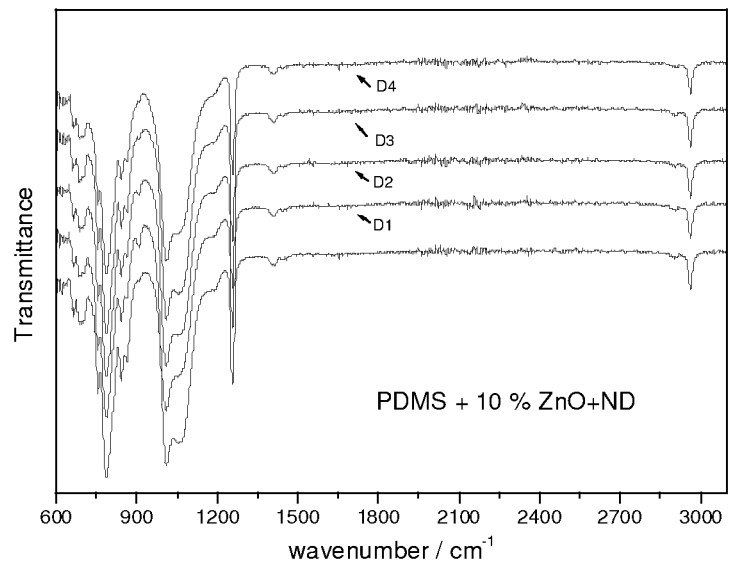
FIG. 10 shows FTIR spectra in the wavenumber range 600-3100 cm$^{-1}$ of PDMS containing a mixture of 5% wt of 10-30 nm ZnO functionalized with silane coupling agent and 5% wt 120 nm ND un-irradiated and following irradiation at four different conditions (D1, D2, D3, D4) in vacuum with 2 MeV proton beam radiation.

FIG. 10 shows FTIR spectra in the wavenumber range 600-3100 $cm^{-1}$ of PDMS containing a mixture of 5% wt of 10-30 nm ZnO functionalized with silane coupling agent and 5% wt 120 nm ND un-irradiated and following irradiation at different conditions (D1, D2, D3, D4) in vacuum with 2 MeV proton beam radiation.

Example 11

FTIR Characterization of Proton Irradiated PDMS with Mixture of DND and MWCNT

The mechanism by which CNTs and ND impart high energy radiation resistance may be different. The combination of the two may impart even greater high energy radiation resistance. In order to evaluate the combination, FTIR spectra were obtained in the wavenumber range 600-3100 $cm^{-}$ of PDMS containing 0.5% wt 120 nm ND and 0.5% wt MWCNT un-irradiated and following irradiation at the same four conditions (D1, D2, D3, D4) as those used for Example 6 and 7. A comparison of the IR spectra in FIG. 11 with those in FIGS. 6 and 7 reveal that the combination provides about the same order of magnitude high energy radiation resistance as 1 wt % MWCNT or 1 wt % 40 nm DND. In comparison with the pure PDMS, 1 wt % mixture of DND and MWCNT provides approximately an order of magnitude improvement in high energy radiation resistance.

Figure 11:
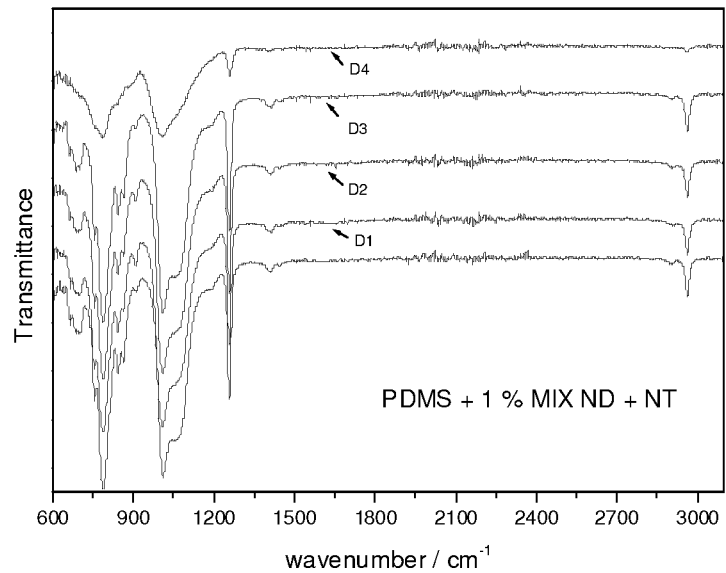
FIG. 11 shows FTIR spectra in the wavenumber range 600-3100 cm$^-$ of PDMS containing 0.5% wt 120 nm ND and 0.5% wt MWCNT un-irradiated and following irradiation at four different conditions (D1, D2, D3, D4) in vacuum with 2 MeV proton beam radiation.

FIG. 11 shows FTIR spectra in the wavenumber range 600-3100 $cm^{-}$ of PDMS containing 0.5% wt 120 nm ND and 0.5% wt MWCNT un-irradiated and following irradiation at four different conditions (D1, D2, D3, D4) in vacuum with 2 MeV proton beam radiation.

Example 12

FTIR Characterization of Proton Irradiated PU

The crosslinking or/and scission reactions in polymers induced by high energy ionizing radiation vary depending upon the molecular structure of the polymer. In order to compare the impact of the 2 MeV protons on PU as compared to PDMS FTIR spectra were obtained in the wavenumber range 600-3100 cm$^{-1}$ of pure PU un-irradiated and following irradiation at the same conditions (D1, D2) as those used for Example 1. Significant degradation (appearance of uneven surface and pitting) was observed for areas irradiated at conditions D3, D4 and FTIR spectra were not taken. The PU does not appear to be as stable as PDMS when exposed to 2 MeV protons.

Example 13

FTIR Characterization of Proton Irradiated PU-DND

FTIR spectra were obtain in the wavenumber range 600-3100 cm$^{-1}$ of PU containing 1% wt 120 nm ND un-irradiated and following irradiation at four different conditions (D1, D2, D3, D4) in vacuum with 2 MeV proton beam radiation. FTIR spectra of the nanocomposite PU-DND material are presented in FIG. 13 and compared to the spectra of the pure polymer in FIG. 12. From the comparison of the FTIR spectra of the pure PU polymer (FIG. 12) and the PDMS-DND composite material (FIG. 13) it can clearly be seen that the vibrational band intensities, representing sample changes, decrease and disappear more slowly with fluence for the PU-DND nanocomposite as compared to the pure polymer. Particularly, in the case of pure PU under the fluence D2, the vibration bands have already decreased in intensity, while in the composite PU-DND material even at one order of magnitude higher fluence (D3), the bands are still clearly present. Thus, it can be concluded that the PU-DND nanocomposite material is more stable in a high energy radiation environment.

Figure 12:
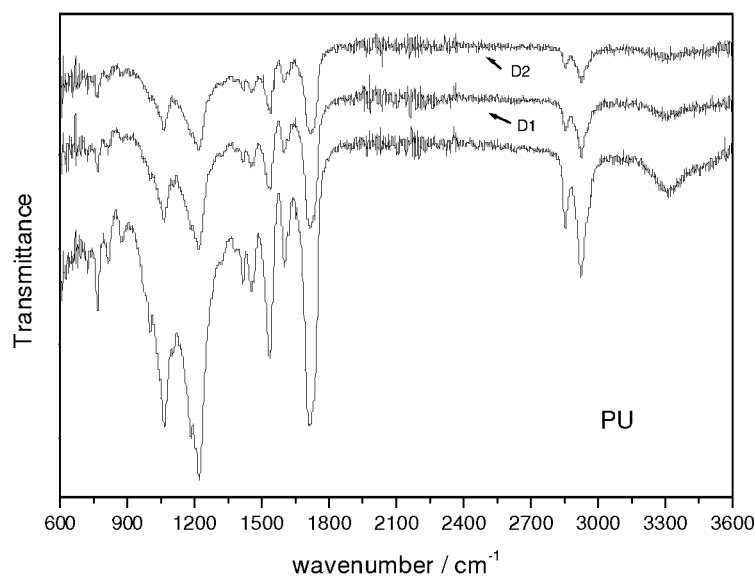
FIG. 12 shows FTIR spectra in the wavenumber range 600-3100 cm$^{-1}$ of pure PU un-irradiated and following irradiation at two different conditions (D1 and D2) in vacuum with 2 MeV proton beam radiation. Significant degradation (uneven surface and pitting) was observed for areas irradiated at conditions D3, D4 and FTIR spectra were not taken.
Figure 13:
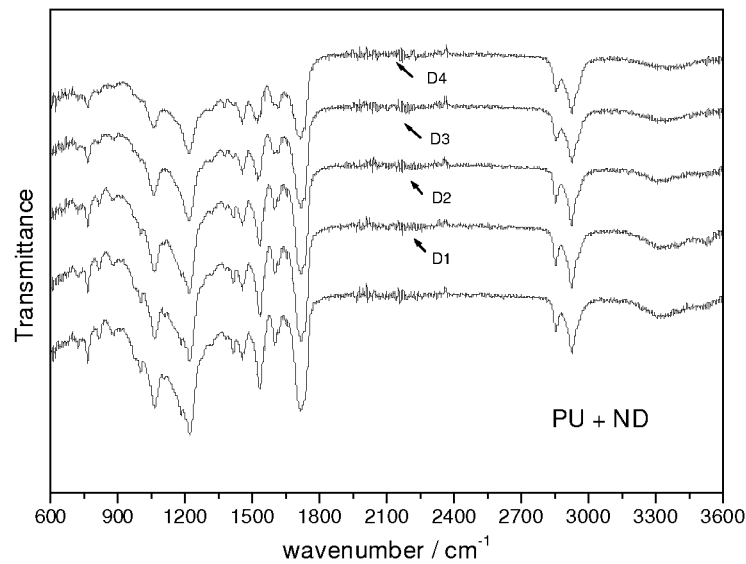
FIG. 13 shows FTIR spectra in the wavenumber range 600-3100 cm$^{-1}$ of PU containing 1% wt 120 nm ND un-irradiated and following irradiation at four different conditions (D1, D2, D3, D4) in vacuum with 2 MeV proton beam radiation.

FIG. 12 shows FTIR spectra in the wavenumber range 600-3100 cm$^{-1}$ of pure PU un-irradiated and following irradiation at two different conditions (D1 and D2) in vacuum with 2 MeV proton beam radiation. Significant degradation (appearance of uneven surface and pitting) was observed for areas irradiated at conditions D3, D4 and FTIR spectra were not taken. FIG. 13 shows FTIR spectra in the wavenumber range 600-3100 cm$^{-1}$ of PU containing 1% wt 120 nm ND un-irradiated and following irradiation at four different conditions (D1, D2, D3, D4) in vacuum with 2 MeV proton beam radiation.

Example 14

FTIR Characterization of Proton Irradiated PU with a Mixture of DND and MWCNT

The use of a combination of two different nanoparticles may impart even greater high energy radiation resistance as considered in Example 11. In order to evaluate the combination of DND and MWCNT, FTIR spectra were obtained in the wavenumber range 600-3100 cm$^{-1}$ of PU containing a mixture of 0.5%% wt 120 nm ND and 0.5% wt MWCNT un-irradiated and following irradiation at two different conditions (D2, D3) in vacuum with a 2 MeV proton beam radiation. The IR spectra for the fluencies D3 and D4 were not obtained due to the rapid degradation of the PU under these conditions. A comparison of the FTIR spectra in FIGS. 13 and 14 reveals that the PU containing 1 wt % DND exhibits greater high energy radiation resistance than a 1 wt % mixture of DND and MWCNT. The presence of the MWCNT appeared to induce physical changes in the sample.

Figure 14:
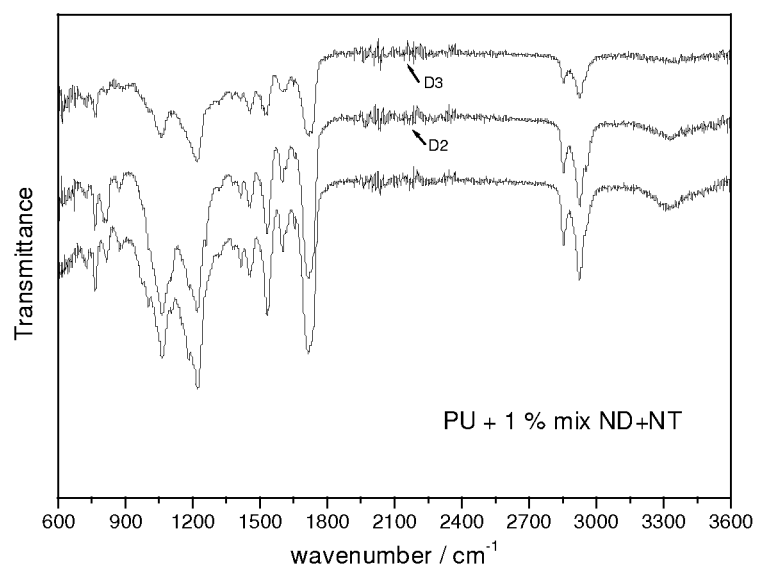
FIG. 14 shows FTIR spectra in the wavenumber range 600-3100 cm$^{-1}$ of pure PU containing a mixture of 0.5%% wt 120 nm ND and 0.5% wt MWCNT un-irradiated and following irradiation at two different conditions (D2, D3) in vacuum with 2 MeV proton beam radiation.

FIG. 14 shows FTIR spectra in the wavenumber range 600-3100 cm$^{-1}$ of pure PU containing a mixture of 0.5%% wt 120 nm ND and 0.5% wt MWCNT un-irradiated and following irradiation at two different conditions (D2, D3) in vacuum with 2 MeV proton beam radiation.

Overall Process and Prothetic Examples

FIGS. 15-17 show examples of implementations of overall processes suitable for implementing certain embodiments consistent with the present invention. In the following discussion, some of the examples discussed may be prothetic extrapolations of processes and materials that can reasonably be deduced from the above experiments. In FIG. 15, process 10 begins at 12 after which a polymer which is to be exposed to and protected from high energy ionizing radiation is selected at 14. It is believed that this polymer can be selected, for example, from any number of polymers such as poly (dimethylsiloxane) (PDMS), polyurethane (PU), Polyethylene (PE), poly(methyl methacrylate) (PMMA), poly(4-methyl-1-pentene) (PMP), polyvinylchloride (PVC), glycol-modified polyethylene terephthalate (PETG), polystyrene (PS), acrylonitrile-butadiene-styrene co-polymer (ABS), polyphenylene ether (PPE), polycarbonate (PC), polysulfone (PSU), polyethersulfone (PES), polyetherimide (PEI), polyphenylsulfone (PPSU), polyethylene terephthalate (PET), and polybuylene terephthalate (PBT).

At 16, nanodiamond particles or ZnO nanoparticles are dispersed into the polymer. This can be done by blending the particles directly with the uncured polymer matrix or by forming a colloidal suspension of the nanoparticles and blending that with the polymer or a mixture of the polymer and a solvent to the polymer. At 18, the polymer is cured to produce the nanocomposite material. In curing the polymer, any solvents are evaporated. The polymer may then be exposed to high energy ionizing radiation and the radiation can be proton irradiation in any of the present examples.

The example of process 22 of FIG. 16 differs from that of process 10 in that in addition to nanodiamonds, other nanoparticles such as ZnO or carbon-based nanomaterials can be dispersed at 26 into the polymer in a manner similar to that discussed above—either directly or by introduction via one or more colloidal solutions and solvents to the polymer.

The example of process 30 of FIG. 17, the nanodiamonds or ZnO possibly in combination with other nanoparticles are dispersed into the polymer at 32 and the material is then molded, cast or coated over a substrate at 36 to produce a structure of a specified shape. After curing at 18, an overlayer can optionally be applied at 38 to provide additional protection. The overlayer can be ceramic, metal, paint, etc.

In each case, the high energy ionizing radiation may be galactic radiation when the finished product is used in an outer space application, or may be artificially generated radiation. In one example, a surgical instrument made of the polymer or coated with the polymer may be exposed to high energy ionizing radiation as a part of a sterilization process.

The nanodiamond can be natural nanodiamond or synthetic nanodiamond or diamondoids, and the nanodiamond can be nanodiamond surrounded by a sp2 carbon shell and/or may be functionalized. The size of nanodiamond particles can range between approximately 1 nanometers and approximately 1 micron. In examples, the concentration of nanodiamonds can range from 0.01 wt. % to 10 wt. % including examples at 1 wt. % and 5 wt. %. Each example tested was less than 10 wt. % for any of the particle types tested, but this should not be considered limiting and the ranges above include any sub-range. The particles in all examples are preferably uniformly dispersed in the polymer or at least uniformly dispersed at the surface of the polymer.

In the examples, structural degradation of polymer-DND composites takes place at approximately an order of magnitude higher fluence than for the pure polymer alone. In some instances, structural degradation of polymer-DND composites takes place at approximately two to five times higher fluence than for the pure polymer alone.

Thus, in certain examples, a method for providing a nanocomposite material with resistance to ionizing radiation involves providing a polymer matrix that is to be subjected to high energy ionizing radiation when in use; producing a polymer nanocomposite by dispersing nanodiamond particles within the polymer matrix; and subjecting the nanocomposite polymer to high energy ionizing radiation, whereby the polymer nanocomposite exhibits improved resistance to degradation over the polymer matrix in the absence of the nanodiamond particles.

In certain examples, the method further involves providing a colloidal suspension of nanodiamond particles in a solvent to the polymer; admixing the colloidal suspension of nanodiamond particles with the polymer to produce an admixture; and curing the admixture to produce the polymer nanocomposite. In certain examples, the method further involves coating the admixture onto a substrate where the solvent is evaporated when the admixture is cured to produce the polymer nanocomposite. In certain examples, the process further involves providing a colloidal suspension of nanodiamond particles in a first solvent; dissolving the polymer in a second solvent to produce a polymer solution; admixing the colloidal suspension of nanodiamond particles and the polymer solution to produce an admixture; removing the first and second solvents; and curing the admixture to produce the polymer nanocomposite.

In certain examples, the plurality of nanodiamonds is substantially uniformly dispersed within the polymer matrix. In certain examples, the plurality of nanodiamonds is substantially uniformly dispersed within the polymer matrix and a chemical bond is formed between the nanodiamond and the polymer. In certain examples, the nanodiamond particles are functionalized or coated with metals, oxides or other nanoparticles. In certain examples, the nanodiamonds are chemically bonded with the polymer by at least one of condensation reactions, radical reactions, metal catalyzed coupling, photochemical processes, sonochemical processes, irradiation of the films formed from mechanical mixture of the structures, by heat treatment, or by plasma processes. In certain examples, the process further involves molding or casting the nanocomposite material. In certain examples, the nanodiamond of the nanocomposite is at least dispersed within a surface layer of the polymer nanocomposite. In certain examples, the concentration of the nanodiamond in the polymer nanocomposite is between about 0.01 wt. % and about 10 wt. %. In other examples, the concentration is between 1 wt. % and 5 wt. %. In other examples, the concentration is between 5 wt. % and 10 wt. %. In certain examples, the concentration of the nanodiamond in the polymer composite is less than about 10 wt. %.

In other examples, the polymer is selected from the group consisting of: poly(dimethylsiloxane) (PDMS), polyurethane (PU), Polyethylene (PE), poly(methyl methacrylate) (PMMA), poly(4-methyl-1-pentene) (PMP), polyvinylchloride (PVC), glycol-modified polyethylene terephthalate (PETG), polystyrene (PS), acrylonitrile-butadiene-styrene co-polymer (ABS), polyphenylene ether (PPE), polycarbonate (PC), polysulfone (PSU), polyethersulfone (PES), polyetherimide (PEI), polyphenylsulfone (PPSU), polyethylene terephthalate (PET), and polybuylene terephthalate (PBT).

In some examples, the concentration is between 1 wt. % and 5 wt. %. the ionizing radiation comprises at least one of galactic cosmic radiation and artificially generated high energy ionizing radiation. In other examples, a structure is fabricated from the polymer nanocomposite where the structure is used in a space environment, a biomedical device, a nuclear reactor, a high energy particle accelerator or a scintillator. In other examples, the process further involves coating the polymer nanocomposite with a protective overlayer, and where the, where the protective overlayer is selected from the group consisting of metal, ceramic, oxide, nitride, carbide, boride, paint or a combination thereof. In certain examples, the nanodiamond is surrounded by a sp2 carbon shell. In certain examples, the size of nanodiamond particles ranges between 1 nanometers and 1 micron. In certain examples, additional carbon-based nanomaterials are dispersed within the polymer matrix.

In certain examples, the process further involves providing a colloidal suspension of nanodiamond particles in a solvent to the polymer; disbursing additional carbon-based nanomaterials into the suspension; admixing the colloidal suspension with the polymer; and curing the admixture to produce the polymer nanocomposite. In certain examples, the method further involves providing a colloidal suspension of nanodiamond particles in a first solvent; disbursing additional carbon-based nanomaterials into the suspension; dissolving the polymer in a second solvent to form a solution containing the dissolved polymer; admixing the colloidal suspension of nanodiamond particles and the solution containing the dissolved polymer; removing the first and second solvents; and curing the admixture to produce the polymer nanocomposite.

In certain examples, the additional carbon-based nanomaterials are comprised of predominantly sp2 carbon bonded materials. In certain examples, the additional carbon-based nanomaterials comprise at least one of single walled carbon nanotubes, multiwalled carbon nanotubes and carbon onions. In certain examples, at least one additional nanomaterial is dispersed into the suspension that comprises a non-carbon based nanomaterial. In certain examples, the average aggregate size of nanodiamond particles ranges between 1 nanometer and 1 micron. In certain examples, the nanodiamond particles are functionalized or coated with metals, oxides or other nanoparticles. In certain examples, the concentration of nanodiamond particles in the nanocomposite is below approximately 10 wt. %. In certain examples, the concentration of the carbon-based nanomaterial in the nanocomposite is below approximately 10 wt. %. In certain examples, at least one of the additional carbon nanomaterials is functionalized. In certain examples, zinc-oxide (ZnO) is additionally dispersed within the polymer matrix.

In another example, a method for providing a nanocomposite material with resistance to high energy ionizing radiation involves providing a polymer matrix that is to be subjected to the high energy ionizing radiation when in use; producing a polymer nanocomposite comprising zinc oxide (ZnO) nanoparticles dispersed within the polymer matrix; and subjecting the nanocomposite polymer to high energy ionizing radiation, whereby the nanocomposite exhibits improved resistance to degradation as compared to irradiated pure polymer.

In certain examples, the method further involves providing a colloidal suspension of ZnO particles in a solvent to the polymer; admixing the colloidal suspension of ZnO particles with the polymer to produce an admixture; and curing the admixture to produce the polymer nanocomposite. In certain examples, the method further involves coating a substrate with the polymer nanocomposite, and curing the polymer nanocomposite. In certain examples, the method further involves providing a colloidal suspension of ZnO particles in a first solvent; dissolving the polymer in a second solvent to produce a polymer solution; admixing the colloidal suspension of ZnO particles and the polymer solution to produce an admixture; removing the first and second solvents; and curing the admixture to produce the polymer nanocomposite.

In certain examples, the plurality of ZnO nanoparticles is substantially uniformly dispersed within the matrix of the polymer. In certain examples, the plurality of ZnO nanoparticles are substantially uniformly dispersed within the matrix of the polymer and a chemical bond is formed between the ZnO nanoparticles and the polymer. In certain examples, the ZnO nanoparticles are functionalized. In certain examples, the ZnO nanoparticles are chemically bonded with the polymer by condensation reactions, radical reactions, metal catalyzed coupling, photochemical processes, sonochemical processes, irradiation of the films formed from mechanical mixture of the structures, by heat treatment, or by plasma processes. In certain examples, the polymer nanocomposite is molded or cast.

In certain examples, the ZnO nanoparticles of the nanocomposite are at least dispersed within a surface layer of the polymer. In certain examples, the concentration of the ZnO nanoparticles is between about 0.01 wt. % and about 10 wt. %, or between 1 wt. % and 5 wt. % or between 5 wt. % and 10 wt. %.

In certain examples, the polymer is selected from the group consisting of: poly(dimethylsiloxane) (PDMS), Polyurethane (PU), Polyethylene (PE), poly(methyl methacrylate) (PMMA), poly(4-methyl-1-pentene) (PMP), polyvinylchloride (PVC), glycol-modified polyethylene terephthalate (PETG), polystyrene (PS), acrylonitrile-butadiene-styrene co-polymer (ABS), polyphenylene ether (PPE), polycarbonate (PC), polysulfone (PSU), polyethersulfone (PES), polyetherimide (PEI), polyphenylsulfone (PPSU), polyethylene terephthalate (PET), and polybuylene terephthalate (PBT).

In certain examples, the high energy ionizing radiation comprises at least one of galactic cosmic radiation and artificially generated high energy ionizing radiation. In certain examples, a structure fabricated from or coated with from the polymer nanocomposite where the structure is used in a space environment, a biomedical device, a nuclear reactor, a high energy particle accelerator or a scintillator. In certain examples, the size of ZnO particles ranges between 1 nanometers and 1 micron. In certain examples, the polymer nanocomposite is coated with a protective overlayer, and where the, where the protective overlayer is selected from the group consisting of metal, ceramic, oxide, nitride, carbide, boride, paint or a combination thereof.

In another example, a method for providing a nanocomposite material with resistance to high energy ionizing radiation involves providing a polymer matrix that is to be subjected to high energy ionizing radiation when in use; producing a polymer nanocomposite by dispersing nanodiamond particles and zinc oxide (ZnO) nanoparticles within the polymer matrix; and subjecting the nanocomposite polymer to high energy ionizing radiation, whereby the polymer nanocomposite exhibits improved resistance to degradation over the polymer matrix in the absence of the nanodiamond particles.

In another example, a method for providing a nanocomposite material with resistance to high energy ionizing radiation involves providing a polymer matrix that is to be subjected to high energy ionizing radiation when in use; producing a polymer nanocomposite by dispersing nanoparticles selected from the group consisting of: nanodiamond particles, zinc oxide (ZnO) nanoparticles: both nanodiamond particles and ZnO nanoparticles within the polymer matrix, nanodiamond particles and carbon-based nanoparticles, and ZnO nanoparticles and carbon-based nanoparticles; and subjecting the nanocomposite polymer to high energy ionizing radiation, whereby the polymer nanocomposite exhibits improved resistance to degradation over the polymer matrix in the absence of the nanodiamond particles.

While certain illustrative embodiments have been described, it is evident that many alternatives, modifications, permutations and variations will become apparent to those skilled in the art in light of the foregoing description.

What is claimed is:

1. A method for providing a nanocomposite material with resistance to high energy ionizing radiation, comprising:
   providing a polymer matrix that is to be subjected to high energy ionizing radiation when in use;
   producing a polymer nanocomposite by substantially uniformly dispersing nanodiamond particles within the polymer matrix, where the concentration is selected to provide improved resistance to degradation of the polymer nanocomposite in the presence of high energy ionizing radiation over the polymer matrix in the absence of the nanodiamond particles; and
   subjecting the nanocomposite polymer to high energy ionizing radiation, whereby the polymer nanocomposite exhibits improved resistance to degradation over the polymer matrix in the absence of the nanodiamond particles.

2. The method of producing a nanocomposite material with resistance to high energy ionizing radiation according to claim 1, further comprising:
   producing the polymer nanocomposite by:
      providing a colloidal suspension of nanodiamond particles in a solvent to the polymer;
      admixing the colloidal suspension of nanodiamond particles with the polymer to produce an admixture; and
      curing the admixture to produce the polymer nanocomposite.

3. The method of producing a nanocomposite material with resistance to high energy ionizing radiation according to claim 2, further comprising:
   prior to curing the admixture, coating the admixture onto a substrate; and
   where the solvent is evaporated when the admixture is cured to produce the polymer nanocomposite.

4. The method of producing a nanocomposite material with resistance to high energy ionizing radiation according to claim 1, further comprising:
   producing the polymer nanocomposite by:
      providing a colloidal suspension of nanodiamond particles in a first solvent;
      dissolving the polymer in a second solvent to produce a polymer solution;
      admixing the colloidal suspension of nanodiamond particles and the polymer solution to produce an admixture;
      removing the first and second solvents; and
      curing the admixture to produce the polymer nanocomposite.

5. The method of producing a nanocomposite material with resistance to high energy ionizing radiation according to claim 1, where the concentration of the nanodiamond in the polymer nanocomposite is between about 1.0 wt. % and about 5.0 wt. %.

6. The method of producing a nanocomposite material with resistance to high energy ionizing radiation according to claim 1, where the nanodiamond particles are substantially uniformly dispersed within the polymer matrix and a chemical bond is formed between the nanodiamond and the polymer.

7. The method of producing a nanocomposite material with resistance to high energy ionizing radiation according to claim 6, where the nanodiamond particles have a surface and where the surface of the nanodiamond particles is functionalized or the surface of the nanodiamond particles is coated with metals, oxides or nanoparticles other than nanodiamond particles.

8. The method of producing a nanocomposite material with resistance to high energy ionizing radiation according to claim 7, where at least a portion of the nanodiamond particles are surrounded by a sp2 carbon shell.

9. The method of producing a nanocomposite material with resistance to high energy ionizing radiation according to claim 6, where producing the polymer nanocomposite further comprises: chemically bonding the nanodiamond particles with the polymer by at least one of condensation reactions, radical reactions, metal catalyzed coupling, photochemical processes, sonochemical processes, irradiation of the films formed from mechanical mixture of the structures, by heat treatment, or by plasma processes.

10. The method of producing a nanocomposite material with resistance to high energy ionizing radiation according to claim 1, where producing the polymer nanocomposite by dispersing nanodiamond particles within the polymer matrix further comprises molding or casting the nanocomposite material.

11. The method of producing a nanocomposite material with resistance to high energy ionizing radiation according to claim 1, where the nanodiamond of the nanocomposite is at least dispersed within a surface layer of the polymer nanocomposite.

12. The method of producing a nanocomposite material with resistance to high energy ionizing radiation according to claim 1, where the concentration of the nanodiamond in the polymer nanocomposite is between about 0.01 wt. % and about 10 wt. %.

13. The method of producing a nanocomposite material with resistance to high energy ionizing radiation according to claim 1 where the concentration of the nanodiamond in the polymer nanocomposite is less than about 10 wt. %.

14. The method of producing a nanocomposite material with resistance to high energy ionizing radiation according to claim 1, where the polymer is selected from the group consisting of: poly(dimethylsiloxane) (PDMS), polyurethane (PU), Polyethylene (PE), poly(methyl methacrylate) (PMMA), poly(4-methyl-1-pentene) (PMP), polyvinylchloride (PVC), glycol-modified polyethylene terephthalate (PETG), polystyrene (PS), acrylonitrile-butadiene-styrene co-polymer (ABS), polyphenylene ether (PPE), polycarbonate (PC), polysulfone (PSU), polyethersulfone (PES), polyetherimide (PEI), polyphenylsulfone (PPSU), polyethylene terephthalate (PET), and polybuylene terephthalate (PBT).

15. The method of producing a nanocomposite material with resistance to high energy ionizing radiation according to claim 1, where the ionizing radiation comprises at least one of galactic cosmic radiation and artificially generated high energy ionizing radiation.

16. The method of producing a nanocomposite material with resistance to high energy ionizing radiation according to claim 1, where producing a polymer nanocomposite further comprises fabricating a structure from the polymer nanocomposite; and further comprising placing the structure in a space environment, a biomedical device, a nuclear reactor, a high energy particle accelerator or a scintillator.

17. The method of producing a nanocomposite material with resistance to high energy ionizing radiation according to claim 1, further comprising prior to subjecting the nanocomposite polymer to high energy ionizing radiation, coating the polymer nanocomposite with a protective overlayer, and where the protective overlayer is selected from the group consisting of metal, ceramic, oxide, nitride, carbide, boride, paint or a combination thereof.

18. The method of producing a nanocomposite material with resistance to high energy ionizing radiation according to claim 1, where the size of nanodiamond particles ranges between 1 nanometers and 1 micron.

19. The method of producing a nanocomposite material with resistance to high energy ionizing radiation according to claim 1, where producing the polymer nanocomposite further comprises dispersing additional carbon-based nanomaterials within the polymer matrix.

20. The method of producing a nanocomposite material with resistance to high energy ionizing radiation according to claim 19, where at least one of the additional carbon-based nanomaterials is functionalized.

21. The method of producing a nanocomposite material with resistance to high energy ionizing radiation according to claim 1, further comprising:
  producing the polymer nanocomposite by:
    providing a colloidal suspension of nanodiamond particles in a solvent to the polymer;
    disbursing additional carbon-based nanomaterials into the suspension;
    admixing the colloidal suspension with the polymer; and
    curing the admixture to produce the polymer nanocomposite.

22. The method of producing a nanocomposite material with resistance to high energy ionizing radiation according to claim 21, where the additional carbon-based nanomaterials are comprised of predominantly sp2 carbon bonded materials.

23. The method of producing a nanocomposite material with resistance to high energy ionizing radiation according to claim 22, where the additional carbon-based nanomaterials comprise at least one of single walled carbon nanotubes, multiwalled carbon nanotubes and carbon onions.

24. The method of producing a nanocomposite material with resistance to high energy ionizing radiation according to claim 21, further comprising disbursing at least one additional nanomaterial into the suspension that comprises a non-carbon based nanomaterial.

25. The method of producing a nanocomposite material with resistance to high energy ionizing radiation according to claim 21, where the average aggregate size of nanodiamond particles ranges between 1 nanometer and 1 micron.

26. The method of producing a nanocomposite material with resistance to high energy ionizing radiation according to claim 21, where the nanodiamond particles have a surface and where the surface of the nanodiamond particles is functionalized or the surface of the nanodiamond particles is coated with metals, oxides or nanoparticles other than nanodiamond particles.

27. The method of producing a nanocomposite material with resistance to high energy ionizing radiation according to claim 21, where the concentration of nanodiamond particles in the nanocomposite is below approximately 10 wt. %.

28. The method of producing a nanocomposite material with resistance to high energy ionizing radiation according to claim 21, where the concentration of the additional carbon-based nanomaterial in the nanocomposite is below approximately 10 wt. %.

29. The method of producing a nanocomposite material with resistance to high energy ionizing radiation according to claim 1, further comprising:
   producing the polymer nanocomposite by:
      providing a colloidal suspension of nanodiamond particles in a first solvent;
      disbursing additional carbon-based nanomaterials into the suspension;
      dissolving the polymer in a second solvent to form a solution containing the dissolved polymer;
      admixing the colloidal suspension of nanodiamond particles and the solution containing the dissolved polymer;
      removing the first and second solvents; and
      curing the admixture to produce the polymer nanocomposite.

30. The method of producing a nanocomposite material with resistance to high energy ionizing radiation according to claim 1, where producing the polymer nanocomposite further comprises dispersing zinc-oxide (ZnO) within the polymer matrix.

31. A method for providing a nanocomposite material with resistance to high energy ionizing radiation, comprising:
   providing a polymer matrix that is to be subjected to high energy ionizing radiation when in use;
   producing a polymer nanocomposite by substantially uniformly dispersing nanodiamond particles and zinc oxide (ZnO) nanoparticles within the polymer matrix at a concentration of between 0.01% wt. and 10.0% wt. of the nanodiamond particles and the ZnO nanoparticles, where the concentration is selected to provide improved resistance to degradation of the polymer nanocomposite in the presence of high energy ionizing radiation over the polymer matrix in the absence of the nanodiamond particles; and
   subjecting the nanocomposite polymer to high energy ionizing radiation, whereby the polymer nanocomposite exhibits improved resistance to degradation over the polymer matrix in the absence of the nanoparticles.

32. A method for providing a nanocomposite material with resistance to high energy ionizing radiation, comprising:
   providing a polymer matrix that is to be subjected to high energy ionizing radiation when in use;
   producing a polymer nanocomposite by substantially uniformly dispersing nanoparticles within the polymer matrix selected from the group consisting of: nanodiamond particles, zinc oxide (ZnO) nanoparticles, both nanodiamond particles and ZnO nanoparticles, a combination of nanodiamond particles and carbon-based nanoparticles, ZnO nanoparticles and carbon-based nanoparticles at a concentration of between 0.01% wt. and 10.0% wt. of each nanoparticle, where the concentration is selected to provide improved resistance to degradation of the polymer nanocomposite in the presence of high energy ionizing radiation over the polymer matrix in the absence of the nanodiamond particles;
   subjecting the polymer nanocomposite to ionizing radiation, whereby the polymer nanocomposite exhibits improved resistance to degradation over the polymer matrix in the absence of nanoparticles.

33. A method for providing a nanocomposite material with resistance to high energy ionizing radiation, comprising:
   providing a polymer matrix that is to be subjected to high energy ionizing radiation when in use;
   producing a polymer nanocomposite by substantially uniformly dispersing particles selected from the group consisting of: nanodiamond particles, zinc oxide (ZnO) nanoparticles, and both nanodiamond particles and zinc oxide nanoparticles within the polymer matrix at a concentration of between 0.01% wt. and 10.0% wt. of each of the nanoparticles, where the concentration is selected to provide improved resistance to degradation of the polymer nanocomposite in the presence of high energy ionizing radiation over the polymer matrix in the absence of the nanodiamond particles; and
   subjecting the nanocomposite polymer to high energy ionizing radiation, whereby the polymer nanocomposite exhibits improved resistance to degradation over the polymer matrix in the absence of the nanoparticles.

* * * * *